US012528061B2

(12) United States Patent
Barbe

(10) Patent No.: US 12,528,061 B2
(45) Date of Patent: Jan. 20, 2026

(54) APPARATUS AND METHOD FOR PROVIDING ACTIVE AGENT COMPOSITIONS FROM FLUID

(71) Applicant: Hans W. Barbe Chemische Erzeugnisse GmbH, Wiesbaden (DE)

(72) Inventor: Sebastian Barbe, Wiesbaden (DE)

(73) Assignee: Hans W. Barbe Chemische Erzeugnisse GmbH, Wiesbaden (DE)

( * ) Notice: Subject to any disclaimer, the term of this patent is extended or adjusted under 35 U.S.C. 154(b) by 930 days.

(21) Appl. No.: 17/733,094

(22) Filed: Apr. 29, 2022

(65) Prior Publication Data

US 2022/0347639 A1 Nov. 3, 2022

(30) Foreign Application Priority Data

Apr. 29, 2021 (DE) ..................... 10 2021 111 137.4
Apr. 29, 2021 (DE) ..................... 20 2021 102 328.7

(51) Int. Cl.

| | |
|---|---|
| ***B01F 35/22*** | (2022.01) |
| ***B01F 23/40*** | (2022.01) |
| ***B01F 23/50*** | (2022.01) |
| ***B01F 33/84*** | (2022.01) |
| ***B01F 35/221*** | (2022.01) |
| *B01F 101/39* | (2022.01) |

(52) U.S. Cl.

CPC .......... *B01F 35/2209* (2022.01); *B01F 23/49* (2022.01); *B01F 23/59* (2022.01); *B01F 33/8442* (2022.01); *B01F 35/2211* (2022.01); *B01F 2101/39* (2022.01)

(58) Field of Classification Search

CPC .............. B01F 35/2209; B01F 35/2211; B01F 33/8442; B01F 23/49; B01F 23/59; B01F 2101/39

See application file for complete search history.

(56) References Cited

U.S. PATENT DOCUMENTS

| | | | | |
|---|---|---|---|---|
| 5,340,210 | A | 8/1994 | Patel et al. | |
| 9,700,854 | B2 | 7/2017 | Olson et al. | |
| 2001/0000996 | A1 * | 5/2001 | Grimland ............ | E21B 43/2607 366/2 |
| 2012/0127820 | A1 * | 5/2012 | Noles, Jr. ............ | B01F 35/2211 366/142 |
| 2020/0025604 | A1 | 1/2020 | Uebayashi et al. | |

FOREIGN PATENT DOCUMENTS

| | | |
|---|---|---|
| CN | 209680060 U | 11/2019 |

* cited by examiner

*Primary Examiner* — Anshu Bhatia
(74) *Attorney, Agent, or Firm* — Reising Ethington P.C.

(57) ABSTRACT

An apparatus and a method for providing active agent compositions from fluid is provided. The apparatus and method allow providing release agents, mold release agents, or lubricants in various compositions, for example anti-tack agents for compounds for the rubber manufacturing or processing industries. A mixing system for providing active agent compositions from fluid includes a mixing assembly and a control device, the mixing assembly including a conveyor and a plurality of pipe assemblies. The mixing assembly is controlled using the control device.

12 Claims, 15 Drawing Sheets

APPARATUS AND METHOD FOR PROVIDING ACTIVE AGENT COMPOSITIONS FROM FLUID

CROSS REFERENCE TO RELATED APPLICATIONS

This application claims priority to German Patent Application No. DE 10 2021 111 137.4 filed on Apr. 29, 2021, which is incorporated in its entirety herein by reference. This application also claims priority to German Utility Model DE 20 2021 102 328.7 filed on Apr. 29, 2021, which is incorporated in its entirety herein by reference.

BACKGROUND OF THE INVENTION

1. Field of the Invention

The present invention relates to an apparatus and method for providing active agent compositions from fluid. The apparatus and method allow providing release agents, mold release agents or lubricants of various compositions, for example anti-tack agents for compounds for the rubber manufacturing or processing industries.

2. Description of the Related Art

Uncured natural or synthetic rubber compounds are often manufactured in the form of long ribbons or webs, as an intermediate product. Compounds produced in this form can be further processed into tires or other end products.

For storing or transporting these intermediate products until further processing, the webs can be rolled up or can be divided into sections and stacked. This involves a risk for these webs to stick or adhere to one another, which makes further processing difficult or even impossible.

Various release agents and methods for their use have been developed in order to prevent adjacent webs from sticking together in this way.

According to one suitable method it is suggested to apply appropriate release agents, also referred to as anti-tack agents for compounds below, to the respective contact surfaces of the intermediate products before the latter come into contact with one another. The anti-tack agents for compounds are able to effectively reduce or even prevent sticking.

Anti-tack agents for compounds that can be directly used or applied to the intermediate products can be provided in suitable containers, for example in what is known as Intermediate Bulk Containers (IBCs), which are customary in the chemical industry, and can be employed on site, for example on a production line for rubber compounds. Prior to the rolling or stacking of the intermediate products, these anti-tack agents for compounds can then be applied to the surfaces, for example by spraying.

One drawback here is that different anti-tack agents for compounds may be required, or anti-tack agents for compounds in different concentrations, for example when the production line is to switch from one rubber compound to another. For these cases, a plurality of anti-tack agents for compounds have to be provided in appropriate containers next to the production line, which leads to larger space requirements. In addition, there is a risk of confusion.

Another drawback is that, depending on the desired composition and concentration of the respective anti-tack agent for compounds, re-mixing or stirring might be necessary before use, for example if the anti-tack agent for compounds has been on the production line for some time and segregation has started. In such cases it may be necessary for operators on site to check the mixtures and possibly to re-prepare them in order to obtain a usable dispersion or suspension. It may also be the case that a liquid such as water has to be added. This complicates the use of anti-tack agents for compounds and is also very complex due to the necessary small-step subjective process control and, hence, it is associated with high costs and is not user-independent.

Moreover, the water composition often differs from site to site, so that additional customized adjustments might be necessary here.

According to another method it is suggested to store solids in the form of powder and to add liquid only before use in order to obtain an applicable liquid dispersion of the desired anti-tack agent for compounds.

Such a method is disclosed in document US 2020/025604 A1. Here, granules from a supply container can be fed into a target container together with water and mixed there using a stirrer. Once the supply container is empty, it is replaced by another supply container full of granules. As a consequence, the supply is interrupted when changing from one supply container to another, since the containers have to be placed on the permanently installed feeding device.

For such a process, it can be advantageous to store solids or anti-tack agents for compounds at a suitable point in a central system, and to optionally disperse them and, when needed, provide them to the supply points next to the production lines. A drawback hereof is that, for example in the event of failure in the central system, some or all of the production lines cannot be adequately supplied with the anti-tack agent for compounds any more.

Another method is disclosed in U.S. Pat. No. 9,700,854 B2, in which dilution solution can be fed from two sources to a common target container which comprises a weighing device.

Another major drawback to be considered is that sometimes long conveying distances have to be bridged from the central system to the respective supply points. Along these conveying paths, segregation of the anti-tack agent for compounds may occur, which may lead to deposits in and clogging of the pipe systems.

What is furthermore unfavorable is that high-viscosity anti-tack agents for compounds are increasingly being used. For these, too, the conveying distance from the central system to the supply points in the production lines can be too long, and deposits can form particularly easily in the pipes, which are correspondingly difficult to clean. Especially in the case of such high-viscosity anti-tack agents for compounds, short conveying distances are therefore advantageous.

What is desirable, therefore, is a method for providing active agent compositions, such as anti-tack agents for compounds, directly at the supply points of production lines, for example, and which do not have these drawbacks.

It would be favorable if more than one active agent can be supplied or used, in order to be able to flexibly prepare different active agent compositions or concentration ratios.

Switching from one active agent composition to another should be as simple as possible.

At the same time, the conveying distances from the concentrate feed to the application should be kept as short as possible in order to reduce the risk of segregation along the conveying paths.

SUMMARY OF THE INVENTION

Exemplary embodiments disclosed herein provide a mixing system for providing active agent compositions, optionally from fluid, and by a method for providing active agent compositions from fluid.

In some exemplary embodiments provided according to the invention, a mixing system for providing active agent compositions from fluid, the mixing system includes: a mixing assembly including: a conveyor having an inlet; a first pipe assembly having at least one inlet for feeding liquid and having a plurality of outlets for dispensing liquid, each of which can be connected to a target container for receiving active agent compositions; a second pipe assembly having at least one inlet, each of which can be connected to a fluid containing container, and having at least one outlet that is connected to the inlet of the conveyor; and a third pipe assembly having a plurality of outlets, each of which can be connected to a target container for receiving active agent compositions; and a control device configured to control the mixing assembly.

In some exemplary embodiments provided according to the invention, a tank fitting module includes a mixing system. The mixing system includes: a mixing assembly including: a conveyor having an inlet; a first pipe assembly having at least one inlet for feeding liquid and having a plurality of outlets for dispensing liquid, each of which can be connected to a target container for receiving active agent compositions; a second pipe assembly having at least one inlet, each of which can be connected to a fluid containing container, and having at least one outlet that is connected to the inlet of the conveyor; and a third pipe assembly having a plurality of outlets, each of which can be connected to a target container for receiving active agent compositions; and a control device configured to control the mixing assembly.

In some exemplary embodiments provided according to the invention, a method for providing active agent compositions from fluid includes using a mixing system. The mixing system includes: a mixing assembly including: a conveyor having an inlet; a first pipe assembly having at least one inlet for feeding liquid and having a plurality of outlets for dispensing liquid, each of which can be connected to a target container for receiving active agent compositions; a second pipe assembly having at least one inlet, each of which can be connected to a fluid containing container, and having at least one outlet that is connected to the inlet of the conveyor; and a third pipe assembly having a plurality of outlets, each of which can be connected to a target container for receiving active agent compositions; and a control device configured to control the mixing assembly.

BRIEF DESCRIPTION OF THE DRAWINGS

The above-mentioned and other features and advantages of this invention, and the manner of attaining them, will become more apparent and the invention will be better understood by reference to the following description of (an) embodiment(s) of the invention taken in conjunction with the accompanying drawing(s), wherein.

Figure 1:
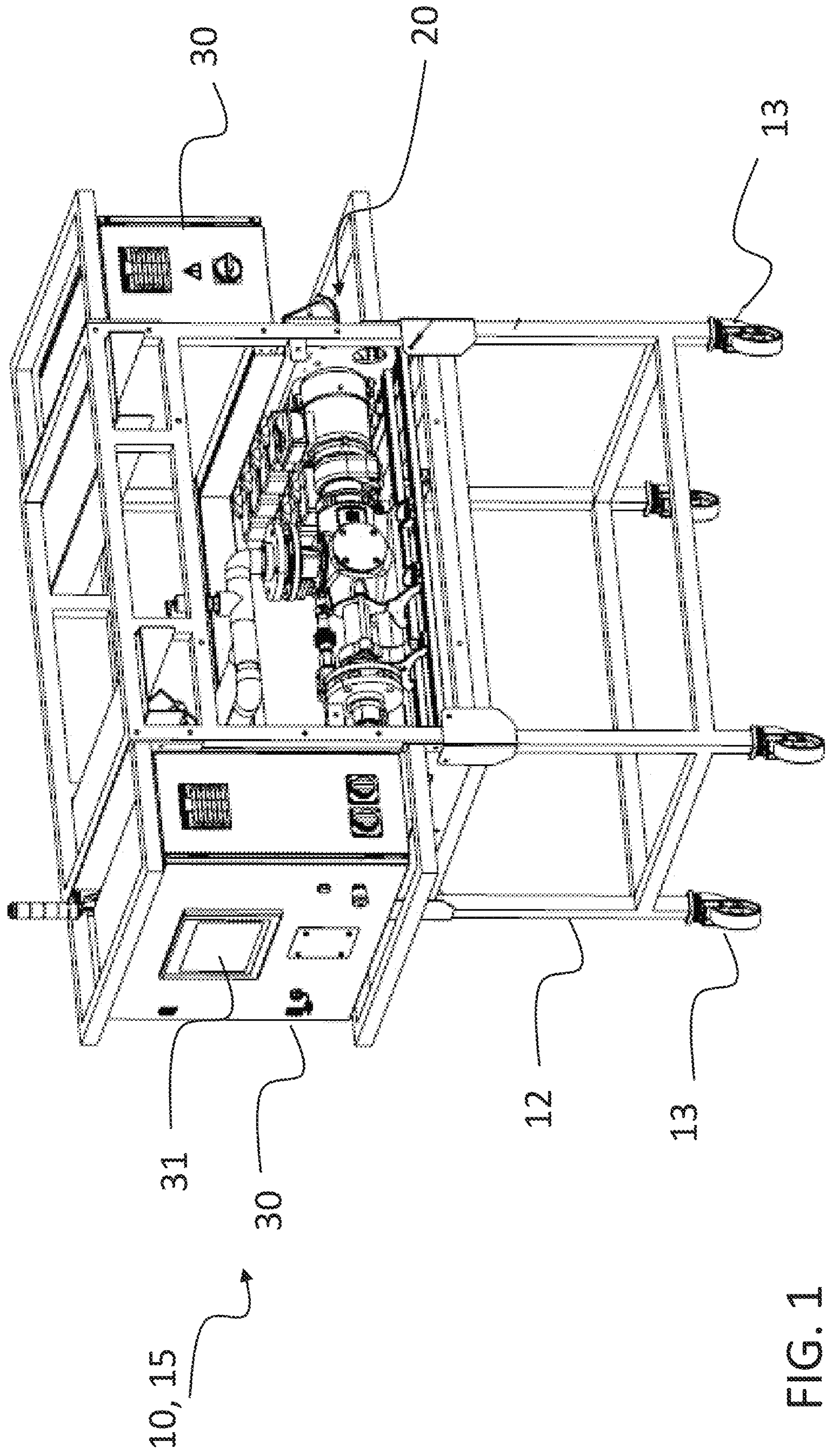
FIG. 1 is a perspective view of an exemplary embodiment of a mixing system provided according to the invention, with a carriage.

Corresponding reference characters indicate corresponding parts throughout the several views. The exemplification (s) set out herein illustrate(s) (one) embodiment(s) of the invention (in one form,) and such exemplification(s) (is) (are) not to be construed as limiting the scope of the invention in any manner.

DETAILED DESCRIPTION OF THE INVENTION

The subject-matter provided according to the invention encompasses a mixing system, in particular a mobile mixing system, for providing active agent compositions from fluid. The mixing system provided according to the invention permits producing different active agent compositions from one or more fluids with or without the addition of liquid, or else from materials in solid form such as a powder. The active agent compositions may differ in the concentrations of active agents and/or in the composition of active agents. For example, the active agent compositions may be or may comprise mixtures, release agents, mold release agents, or lubricants, and also anti-tack agents for compounds.

As far as liquid or the addition of liquid is mentioned in the context of this disclosure, this includes any liquids which are or may be required to produce a dispersion, suspension or a mixed form thereof as an active agent composition. This can primarily be water, for example also distilled water. The invention allows taking into account the on-site conditions and qualities of, for example, water in the preparation of the active agent compositions, which is highly advantageous with regard to various properties of the water available on site, such as conductivity, hardness, contamination (bacteria, foreign matter from feed lines).

In this way, customer-specific manufacturing technologies and requirements can be taken into account.

In the present context, "mobile" is understood to mean that the mixing system can be easily moved from one location to another, for example from one supply point in a production line for rubber compounds to another supply point. The mixing system can be moved with the help of technical aids or industrial trucks such as a manual pallet truck or forklift truck.

In some embodiments, the mixing system can be equipped with or coupled to a carriage so as to facilitate displacement. In some embodiments, the mixing system can therefore also comprise a rack, for example an undercarriage or a frame, which may be equipped with ways for moving. For example, the carriage may be equipped with wheels or rollers for being moved manually by an operator of the system, or the frame may be equipped with fittings for a manual pallet truck or forklift, so that the mobile mixing system can also be easily moved if no carriage with wheels is provided.

This allows the mixing system provided according to the invention to be easily moved by an operator.

In summary, the term "mobile" therefore means that the mixing system can be moved without extensive uninstallation or disassembly, while the disengaging of a coupling of a water supply line or of a hose connection for a container is not considered to be an extensive uninstallation.

For the purposes of the present disclosure, the providing includes the storing, conveying, preparing, processing, and/or dispersing or other preparatory activities that are necessary in order to produce a useful active agent composition from a given material, optionally with the addition of liquids. The material that can be supplied or is supplied to or is fed into the mixing system is optionally in liquid or flowable form and is therefore referred to as a fluid. It may include one or more active agents, active agents in different dosages, liquids or ready-to-use fluids.

The providing may also include the use of supplementary aids or technical equipment, for example a stirring device, in order to keep in motion any material fed into a container. Such technical equipment is not necessarily associated with the mixing system, but may be monitored, controlled and/or closed-loop controlled by it in some embodiments.

In the sense of the present disclosure, active agent composition refers to the material conveyed, produced and made available by the mixing system during operation, which therefore, according to a first aspect, can be prepared so as to be ready for the intended use, for example in a production process, and can directly be applied.

According to some embodiments, however, it may also refer to an intermediate product, such as an active agent composition produced by the mixing system in a diluted form compared to the supplied fluid, and this active agent composition can again be modified before being dispensed, for example mixed with another fluid, before it is provided as a useful active agent composition. The active agent composition is typically produced in liquid form, here.

The material that can be supplied, is supplied to or is fed into the mixing system, i.e. the fluid, is typically in liquid form.

In some embodiments provided according to the invention, which will be discussed in more detail below, it is also possible to feed material in solid form into the mixing system, for example in powder form, or in the form of granules or pellets, in which case the solid material can be mixed with liquid in an intermediate process before it is conveyed through the mixing system. Especially for the preparation of anti-tack agents for compounds, a powdered form can be very favorable in terms of transport weight of the active agent, as well as in terms of costs.

The active agent composition may, for example, comprise an aqueous dispersion, which may optionally contain additional commercially available auxiliaries in the usual concentrations in the fed fluid, such as preservatives, defoamers, oils, or the like. The aqueous dispersion can be prepared by techniques that are known per se, for example by stirring together the fluid and the liquid. An active agent composition may also be produced by diluting the fluid optionally immediately before application thereof, using a liquid as a diluent, optionally water. More generally, an active agent composition may comprise a dispersion, a suspension, or else a mixed form thereof.

In some embodiments, the mixing system provided according to the invention comprises:

- a mixing assembly, and
- a control device.

During operation, the mixing system makes it possible to prepare active agent compositions on the basis of an added or supplied fluid according to predefinable or predefined rules, and to provide it for further processing or for further processes. More generally, within the context of the present disclosure, a fluid that is fed into the mixing system can also be referred to as a source or as originating from a source, and the active agent composition dispensed by the mixing system can be referred to as a sink or target.

For this purpose, the mixing assembly advantageously comprises a conveyor and a plurality of pipe assemblies with different inlets for feeding fluid and/or liquid, and with outlets for dispensing active agent compositions. In this way, the mixing system can convey material that is fed in the form of a fluid from the source to the destination.

It goes without saying that the source and the destination will comprise respective containers for holding fluid and/or active agent composition. Depending on the operating mode and functionality of the mixing system, these containers will also be referred below to as supply or target containers, or else as preparation or mixing containers.

In some embodiments, the mixing system is designed in a modular manner or in the form of a module. Accordingly, at least the mixing assembly and the control device form a structural entity that can be displaced as a whole and connected to a supply point. Hence, the mixing assembly and the control device together form a system module which can be used in a highly flexible manner.

The system module can also comprise or be connectable to a rack, such as a carriage or a frame, for example with fittings for a hand pallet truck or forklift truck. The system module may, for example, be placed on a carriage with rollers, so as to provide particularly high mobility.

In some embodiments, the mixing assembly comprises

- a first pipe assembly having optionally at least one inlet for feeding liquid, and having a plurality of outlets for dispensing liquid, each of which can be connected to a target container for receiving active agent compositions;

a second pipe assembly having at least one inlet, optionally at least two inlets, or else three or more inlets, each of which can be connected to a fluid containing container, in particular a supply container, preparation container, or mixing container, and having at least one outlet which is connected to the inlet of the conveyor;

and furthermore a third pipe assembly having at least one inlet that is connected to the outlet of the conveyor, and having a plurality of outlets, optionally two, more optionally three, four or more outlets, each of which can be connected to a container for receiving active agent compositions, in particular a preparation container, mixing container, or target container;

and the mixing assembly can be controlled by the control device.

As far as inlets or outlets of a pipe assembly are mentioned within the context of the present disclosure, this naturally also includes the connection options known to a person skilled in the art, such as couplings or ports, for establishing a respective fluid-tight connection to a conduit such as a water supply line, or to a container. For example, hoses can be used for this purpose.

The term “pipe assembly” is understood to mean an arrangement of one or more pipes or pipe sections which are connected to one another in a fluid-tight manner and connect the respective associated inlets to the outlets. In some embodiments, the pipe assemblies predominantly or entirely comprise rigid pipes instead of hoses, since the former are more durable, for example in the case of abrasive media, and, moreover, because they are easier to clean.

The second and third pipe assemblies allow to feed fluid to the conveyor, for example from a container, in particular from a supply container, preparation container, or mixing container, and to dispense it, optionally into the target containers. It goes without saying that during operation of the mixing system, the one or more supply container(s) and the one or more target container(s) should optionally be connected to the mixing assembly in a fluid-tight manner for this purpose.

The allocation of inlets and outlets of the mixing system, in particular of the inlets of the second pipe assembly and the outlets of the third pipe assembly to the inlets or outlets of the containers is advantageously made based on the intended operating mode of the mixing system and the supply containers and target containers to be used. Accordingly, during operation of the mixing system, the inlets of the second pipe assembly can be connected to outlets of the supply containers, and the outlets of the third pipe assembly can be connected to inlets of the target containers.

The first pipe assembly is intended to allow to feed liquid from a central supply line into the target containers. Therefore, during operation of the mixing system, the inlet of the first pipe assembly for adding liquid is advantageously connected to a feed line of the corresponding liquid, for example to a water supply line or to a feed line for distilled water.

In some embodiments, the supply lines may also be heated.

The number of outlets of the first pipe assembly is matched with the maximum number of target containers to be supplied, so that each target container can be connected to a supply of liquid from the first pipe assembly. In some embodiments, the first pipe assembly therefore has at least the same number of outlets as the third pipe assembly.

In this sense, a target container can be supplied by the mixing assembly both with fluid from connected supply containers and with liquid from a central feed line.

In particular operating modes of the mixing system, which will be explained in more detail below, it is also possible for an active agent composition to be fed back from a target container into the mixing system and to be conveyed to another target container, so that this material will again pass through the mixing system. In this operating mode, a target container can also function as a supply container at the same time. In other words, a destination of the mixing system is reused as a source. Given this background, the terms preparation container or mixing container will also be used for this purpose. It goes without saying that the ports and connections should be provided accordingly between the mixing system and the containers for these operating modes.

The conveyor is designed for conveying fluid from the source, for example a container in the form of a supply container, preparation container, or mixing container, to a destination such as a target container, preparation container, or mixing container. A pump can be provided for this purpose. Particularly suitable pumps include worm pumps, for example, in particular eccentric worm pumps which enable to convey liquid fluid, but also highly viscous fluid.

Instead of the pump, it is also possible according to some embodiments to provide a mixing device which can both convey and mix. This offers the advantage that mixtures that have already been dosed can be conveyed from the sources to the target containers, so that mixing can be achieved more quickly in these containers.

According to some embodiments, ways for measuring and controlling the flow of material, which are familiar to a person skilled in the art, are arranged at suitable points in the pipe sections. These in particular include couplings, valves, stopcocks, or gates, and/or flow meters. In this way, the mixing assembly can be controlled during operation using the control ways, i.e. the flow through the individual pipe assemblies can be controlled according to respective programs. Optionally, each pipe assembly has associated therewith at least one electrically actuatable stopcock, in particular each inlet and/or outlet of the pipe assembly, as well as a flow meter, so that the material flow can be selectively controlled in each pipe assembly.

The mixing system provided according to the invention thus makes it possible, advantageously, to produce identical or else in particular different active agent compositions from two identical or different active agents, for example, which can be fed into the mixing system using two supply containers. The active agents can be dispensed into the target containers according to predetermined rules and can be mixed there individually with one another and/or with liquid such as water, in order to produce the desired active agent composition.

In other words, in some embodiments, the mixing system provided according to the invention allows producing active agent compositions on the basis of at least one, optionally at least two, three or even more supplied or fed fluids and to dispense them into the associated target containers, and/or to add liquid such as water.

In some embodiments, the mixing system can be configured so as to be fittable on top of a container in a particularly simple manner. In some embodiments, the mixing system can therefore be placed on a container, for example in the form of a supply or target container. This makes it possible for the mixing system to be moved particularly easily together with the container, thus providing particularly high flexibility for the mixing system. Common aids such as industrial trucks, for example manual pallet trucks or forklift trucks, can be used in support of this.

The mixing system can advantageously be configured so as to be or so that it can be placed directly on a container, a tank or another common packaging or bulk packaging, in particular on what is known as an intermediate bulk container (IBC). This means that the mixing system can also be directly combined with standard containers, tanks, packaging, or intermediate bulk containers, for example with commercially available intermediate bulk containers that have a capacity of about 1,000 liters.

In some embodiments, the mixing system is configured such that at least one container, in particular a container that is connected as a source, i.e. a preparation container, mixing container, or supply container, can be placed below and/or above the mixing assembly. The mixing assembly, in particular the pipe assemblies, are therefore located below or above the respective container during operation. In addition to a particularly compact design, this arrangement which is also referred to as a tank fitting module, offers many further advantages which result from the predominantly vertical conveying with short horizontal conveying distances.

In a so-called "sandwich variant" it is suggested to place the mixing system on top of a container and to place a further container on top of the mixing system. Accordingly, the tank fitting module can therefore be located between two containers, for example a preparation container and a mixing or supply container.

For this purpose, the mixing system may be equipped with an appropriate frame which may have seats and fasteners for being firmly and detachably connected, for example by being placed on top of a container and fixed by screwing. This may, for example, comprise a fitting on the side of the mixing system facing the floor for being fitted on a container, and a support for a further container on the opposite, upper side.

Thus, a highly flexible tank fitting module can be provided, which comprises the mixing system provided according to the invention and is configured so that it can be placed directly on a container, tank, or intermediate bulk container. A mixing system provided according to the invention in the form of a tank fitting module offers the advantage of extremely short conveying distances for fluid and active agent composition.

The tank fitting module may therefore comprise plug-on or fitting ways for placing the mixing system on top of a container, for example a tank or intermediate bulk container, and/or a support for accommodating a further container, tank, or intermediate bulk container.

For ease of transport, the tank fitting module may have fittings for a forklift truck.

This permits to further minimize space requirements on the floor, i.e. the footprint.

Most advantageously, the predominantly vertical conveying leads to significantly fewer adhesion or deposits in the pipe sections, merely by virtue of exploiting gravity. This significantly reduces the cost and effort required for cleaning and increases the service life of the mixing system.

Furthermore, this embodiment allows using high-viscosity concentrates, i.e. fluids with a viscosity of, for example, 8000 mPa·s or more as measured at a temperature of 20° C., thus making it possible to employ concentrates with a very high active agent content.

The compact modular arrangement of the mixing system results in another highly positive effect, which can be seen in the fact that this arrangement provides for very short conveying distances for the fluid and/or the active agent compositions. Short lengths of the pipe assemblies, when combined with an appropriate tube cross-section, allowing minimization of energy costs for the conveying, since there is less flow resistance to be overcome. This is particularly well suited for producing active agent compositions from highly viscous fluids.

The mixing system provided according to the invention thus allows to minimize conveying distances which a material supplied in the form of a fluid has to pass from the fluid inlet through the conveyor and to the outlet into the target container. According to the invention, this conveying distance which results from the addition of the lengths of the second and third pipe assemblies, can be shortened to less than 6 m, optionally less than 4 m, and most optionally less than 3 m or even 2 m, for standard industrial container sizes and shapes (e.g. 1,000 L).

The short conveying distances according to the invention offer a further advantage, since overall there will be significantly fewer sections or areas without flow. This means that the use of biocides can be significantly reduced or even avoided altogether.

The mixing system provided according to the invention is therefore not only extremely compact, flexible and mobile, but also allows using a particularly wide range of concentrates, from low-viscosity concentrates to high-viscosity concentrates and even powdery solids, and to produce a wide variety of active agent compositions therefrom. Highly viscous or powdery substances can be dispersed with liquid in the mixing system in order to produce therefrom the active agent compositions in the form of a fluid.

It will be appreciated that other arrangements are possible and conceivable as well, for example an arrangement of the containers, preparation containers, mixing containers, or supply containers laterally next to the mixing assembly, for example such that the control device is placed centrally and so that a lower overall height of the mixing system is ensured.

In some embodiments, the control device is configured for controlling the flow of material through the pipe assemblies and/or the conveyor in order to prepare the desired active agent compositions from the one or more fluids and/or by adding liquid according to particular rules and to control the mixing assembly in this way.

In some embodiments, the control device is therefore configured to control the mixing system on the basis of programs that define the mixing process and/or the operating mode or the functionality of the mixing system. Given this background, the valves or fittings of the mixing assembly and of the pipe assemblies are optionally designed so as to be electrically controllable or closed-loop controllable, so that the control device can be operated to adjust the flow of material by opening and closing valves or cocks or by appropriately controlling the conveyor. Advantageously, purely electrically driven valves are used for this purpose, as this means that there will be no need to supply compressed air at the installation site, and that only a liquid or water connection and a power connection will be required.

The programs can be stored in a memory, for example in the control device. In some embodiments it is also possible for such programs to be stored at another location and to make them available to the control device of the mixing system via appropriate wired or wireless interfaces. This may be useful for centrally controlling a plurality of mixing systems. Moreover, this allows to very easily implement modifications and to transmit modified mixing programs to the control device. Such modifications might become necessary, for example, when the composition of a concentrate changes or the added liquid changes.

In this way it is also possible to implement a specific operating mode for controlling the mixing assembly in order to optimally adapt the mixing system to the specific application conditions. Thus, highly advantageously, the mixing assembly provided according to the invention in combination with the control device makes it possible to operate the mixing system according to different operating modes during operation.

The mixing system can thus advantageously be built cost-effectively in the same design for different applications and can be configured accordingly on site or during commissioning in order to implement the desired operating modes. For this purpose, the control device can be equipped with a user interface.

The mixing system provided according to the invention is highly flexible, so that the control device permits to easily control the mixing assembly in more than one operating mode, optionally in two and more optionally in three or even four different operating modes. The term "operating mode" is understood to mean that the mixing system is adapted for a specific application, i.e. the mixing system is adapted for specific functionalities.

For example, the mixing system can be configured upon commissioning by selecting an operating mode appropriate for the intended application and by setting or programming the control device accordingly for this purpose. This procedure is particularly reliable, since no manipulations or modifications to the mixing system have to be or can be made by operators without extended authorizations.

In some embodiments it is also possible to provide a plurality of different operating modes, which can then be selected by an operator. In other words, the operator can operate the mixing system with different functionalities and can select them on site.

The operating modes presented below represent a selection of suitable operating modes for the mixing system provided according to the invention. Further operating modes that are not detailed here are conceivable and possible.

According to a first exemplary operating mode which is similar to a typical "mixing mode", the mixing system is adapted for preparing active agent compositions, optionally at least two different active agent compositions, more optionally at least three or four different active agent compositions, on the basis of at least one, optionally at least two fluids, and for dispensing the prepared active agent compositions to the associated target containers, and/or for adding liquid, optionally water.

In this operating mode, the first preparation container or mixing container or supply container may contain a first fluid, for example a fertilizer, and the second preparation container or mixing container or supply container may contain a second fluid, for example a crop protection agent. During operation, these fluids can be supplied by the conveyor via the inlets of the second pipe assembly and can be conveyed through the third pipe assembly and to the target containers in order to provide active agent compositions in a desired mixing ratio or in a desired concentration there. The active agent compositions can then be mixed together in the target container using appropriate equipment, with or without the addition of liquid.

In this way it is possible to prepare directly usable active agent compositions, and the number thereof depends on the number of sources that can be connected, i.e. the fluid containers, and on the number of targets or target containers that can be connected. The conveying path is determined by the control device by opening or closing the stopcocks at the associated inlets and outlets.

In the example discussed above, two inlets for fluid and four outlets for active agent compositions are assumed.

Thus, active agent compositions can be produced on the basis of these two fluids in different mixing ratios, for example with a ratio of fertilizer to crop protection agent of 90:10 in target container 1, 80:20 in target container 2, 50:50 in target container 3, or 10:90 in target container 4. It goes without saying that these are purely exemplary data and that obviously any possible composition and concentration is possible and conceivable. As a matter of course it is also possible to supply more than four target containers, for example five, six, seven, or even eight target containers. However, it should be noted here that the necessary pipe assemblies will be correspondingly more complex in this case, since more inlets and/or outlets have to be provided, which might impair the compact design of the mixing system. Moreover, the conveying distances can become longer again as a result.

As needed, liquid such as distilled water can be additionally fed into the target containers via the outlets of the first pipe assembly.

According to a second exemplary operating mode which can also be referred to as a "dilution mode", the mixing system is adapted for pre-dilution, in which case a fluid with a high dosage can be provided in a lower dosage.

In this case, fluid is conveyed from a supply container into a preparation container or mixing container as the target container and provided there in diluted form, i.e. the target container virtually provides a supply container with fluid in a lower dosage. For this purpose, at least one outlet of the first pipe assembly is used for supplying the target container with liquid, for feeding liquid and producing a dilution of the material, and the diluted material is provided in the second supply container. This dilution mode is particularly advantageous if fluid is to be supplied in a highly viscous form.

In some embodiments, the second supply container may have a trigger for this purpose, which can signal to the control device to start further dilution and to refill the second supply container with diluted fluid for further supply purposes.

The mixing system provided according to the invention can advantageously be used in the "dilution mode" to supply up to three target containers with diluted material when a total of four target containers are provided and connected to the mixing system. In other words, in the dilution mode, one target container is used as a preparation container or mixing container, so that the number of different active agent compositions that can be prepared is reduced by one.

According to a third exemplary operating mode which can also be referred to as a "powder preparation mode", the mixing system is adapted for powder preparation. In this operating mode, active agent can be supplied in solid form, for example in powder form, as granules or in the form of pellets; the process is similar to the dilution mode described above.

In this case, active agent can be added to a preparation or mixing container in solid form and can be dispersed there by adding water. In this way, a fluid can be prepared from the active agent in solid form, which can be resupplied to the mixing system. One target container is used as a preparation or mixing container in this case, so that the number of target containers is reduced by one. Accordingly, in the "powder preparation mode" the mixing system provided according to the invention can be used to supply up to three target containers with diluted material on the basis of the active agent in solid form, provided that the third pipe assembly is equipped with four outlets for four target containers.

A fourth, likewise exemplary operating mode represents a combination of the dilution mode and the powder preparation mode. This mode can therefore also be referred to as a "powder preparation with pre-dilution" operating mode.

For this purpose, a water supply can be prepared in one container. In the second supply container, a diluted fluid can be provided by supplying liquid and fluid from the first supply container.

In this operating mode, up to two target containers can be supplied with (diluted) material from the two supply containers, if a total of four target containers are available and connected to the mixing system. In other words, two target containers are used as preparation or mixing containers in the powder preparation mode, so that the number of different active agent compositions that can be prepared is reduced by two.

The invention can thus also make a major contribution to reliability of supply. For example, it is also possible for both supply containers to hold the same fluids with the same dosage, and that a first supply container is used for directly feeding target containers and a second one is used as a backup. As soon as a critical minimum quantity of fluid is reached in the first supply container, the mixing system can supply fluid from the second supply container into the first one, so that the supply from the first supply container is still reliable. The second supply container can then be replaced after it has been emptied.

Alternatively, alternating operation is also conceivable and possible, i.e. the target containers are supplied alternately from one or the other supply container. The flows caused by such pump-over processes serve to ensure that even sensitive active agent compositions, i.e. those that tend to sedimentation or segregation, i.e. demixing, do not sediment, which further contributes to greater stability.

According to a further embodiment of the invention, the mixing system is used to remove dispersions or suspensions from an ongoing process, such as a production line for rubber compounds, and to modify them using the mixing system, for example in order to achieve a rapid change in the concentration of an active agent composition.

Various embodiments are conceivable for this purpose. For example, a portion can be removed to change the composition or concentration. It is also possible to completely remove the material from the process and to replace it with a different active agent composition. This offers several advantages. A change in the composition or concentration in a process can be brought about much more quickly and precisely in this way, so that quick adjustments are possible. This may be particularly favorable for manufacturing processes that run continuously or fully continuously, since change-overs can be effected without any problems.

Furthermore, it is also possible to remove material that is no longer required from the process and to virtually recycle it, i.e. to use it for further or other active agent compositions. This can save costs for disposal.

For this purpose, the connections for the sources, i.e. the inlets of the second pipe assembly can be used to convey the dispersions or suspensions out of the process. Depending on the employed procedure or the desired operating mode, this material or fluid can then be pumped into target tanks for being further diluted with liquid or for being mixed with another fluid until the new, modified concentration is obtained.

In some embodiments, it is moreover possible to provide suitable sensors in the target tanks in order to monitor the changing concentration in the target tanks and to thus be able to control and closed-loop control the concentration obtained. The sensors can be arranged in supply containers and/or target containers. In this way it is possible for used dispersion or suspension from a process to be re-supplied to the process after a respective modification. What can be achieved in this way is that less material has to be discarded and disposed of, and, moreover, that changes in the concentration desired in the process of the production line can be implemented more quickly.

To this end, it may be beneficial to expand the mixing system with additional inlets of the second pipe assembly and/or outlets of the third pipe assembly. If, for example, the second pipe assembly is configured with a further, third inlet, an additional container, for example a so-called Rapid Change (RC) tank can be used for returning the material removed from the process to the process tanks in a controlled manner. If the concentrations differ significantly from one another, i.e. in the case of major changes in concentration, the use of an additional container or tank can prevent disruptions or failures in the production process, so that a significant contribution can be made to supply reliability of the production line.

Advantages can also arise in normal operation, for example by allowing for more homogeneous active agent compositions and thus, for example, for more homogeneous layers in the production process in the production line.

This should be clarified by way of an example. For example, in order to adjust an active agent composition with an active agent concentration of 3% to 2%, because a different rubber compound is being manufactured in the production line, for example, it is not necessary to wait until the 3% active agent composition has be consumed, to obtain an active agent composition with 2% active agent by adding liquid, in particular water. Instead, the required amount of the higher concentrated active agent composition can be removed from the process and made up with liquid to obtain the lower concentration.

Advantages will also be achieved in the case of an enrichment, i.e. an increase in the concentration, since interruptions can be avoided.

Better homogeneity of the active agent composition can be achieved when the removed material is fed back while taking into account the set process concentration.

In some embodiments provided according to the invention, which may be particularly suitable for ready-to-use fluids, the number of inlets of the second pipe assembly is increased. This is favorable when mixing or dilution is not intended to be only achieved in the target tank, but rather a ready-to-use fluid is to be provided as a directly employable active agent composition.

For example, with two additional inlets it is possible to convey a diluted material from a first supply container to a second supply container without any modifications to the piping or connections, and to convey a diluted second material from a third supply container to a fourth container.

In this way it is also possible to combine the operating modes mentioned above. For example, according to some embodiments it is contemplated to have the second pipe assembly configured with four inlets. This, most advantageously, allows providing ready-to-dose active agent compositions from more than two sources. For example, active agent in solid form such as powder form can be used to be provided in one source, in which case two inlets can be used for powder preparation with supply provision, and two further inlets can be used for fluids, for example in different dosages or with different active agents.

In some embodiments, comprehensive leakage protection is provided. Sensors can be connected to the system in order to detect a possible leakage. Respective signal inputs are provided in the system. When a leakage is detected, all conveying processes can be stopped by switching off the conveyor, in this case the pump, and uncontrolled escape and overflow of fluid or liquid can be counteracted by closing valves and/or stopcocks. In some embodiments, the sensors are usually installed in or on collecting containers or troughs which are arranged below the mixing system itself or below the source tanks connected to the mixing system. This can also be implemented in order to comply with local regulations. Operational safety of the system can thus be significantly increased. The collection containers or troughs may advantageously be coupled to the mixing system such that they can be moved together therewith.

The subject-matter of the invention therefore also provides a method for providing active agent compositions from fluid, optionally by using the mixing system provided according to the invention as described above.

The method makes it possible to provide active agent compositions from fluids and/or with the addition of liquid.

The method can include different operating modes of the mixing system, in particular a mixing mode, a dilution mode, a powder preparation mode, or a combination thereof, or others. These operating modes can be fixed, i.e. permanently predefined, for example during commissioning, or they can be changed and adapted by an operator.

The mixing system and the method for providing active agent compositions from fluid thus allow simply and flexibly producing active agent compositions, for example mixtures such as fertilizer or crop protection mixtures for agriculture, or other mixtures, release agents, mold release agents, or lubricants, for example anti-tack agents for compounds for the rubber processing industry.

However, the mixing system provided according to the invention and the method provided according to the invention can also be employed in polymer processing, for example.

Referring now to the drawings, FIG. 1 shows a perspective view of an exemplary embodiment of a mixing system 10 provided according to the invention.

In the illustrated embodiment, the mixing system 10 for providing active agent compositions from fluid is implemented in the form of a mobile mixing system.

Thus, the mixing system 10 can be easily moved from one site to another, for example from one supply point at a rubber compound production line to another supply point.

In order to be displaceable particularly easily by an operator, the mixing system 10 in the exemplary embodiment is equipped with a frame 12 comprising wheels 13 for moving and can therefore be displaced by an operator without further aids.

The illustrated mobile mixing system 10 is designed such that it can be moved without extensive de-installation or disassembly. For this purpose, easily releasable couplings are provided at the inlets and outlets.

The providing of active agent compositions includes the storing, transporting, preparing, processing and/or dispersing or other activities that are required to produce, from a supplied material or fluid, optionally with the addition of liquids, a useful active agent composition that can be used in a subsequent process. Accordingly, the providing may also include the use of supplementary aids or technical equipment such as a stirring device, for example in order to keep in motion the supplied material in a container. These are not shown in the illustrated view.

The illustrated mixing system 10 is adapted for preparing the active agent composition such that it is ready for the intended use, or else for producing active agent compositions as an intermediate product, which can be re-processed by the mixing system 10 in a multi-stage process.

The active agent composition may in particular comprise an aqueous dispersion, and may optionally contain additional commercially available auxiliaries, such as preservatives, defoamers, oils or the like, in the usual concentrations.

The aqueous dispersion can be prepared by methods known per se, for example by combining fluid and liquid by stirring. An active agent composition may also be prepared by diluting the fluid, optionally immediately before use, using a diluent in the form of a liquid, such as water or distilled water.

The illustrated mobile mixing system 10 comprises a mixing assembly 20 and a control device 30.

In the embodiment shown, the mixing system 10 is designed in a modular manner, i.e. as a module. The mixing assembly 20 and the control device 30 form a structural entity which can most advantageously be moved as a whole and can be connected to a supply point. Accordingly, the mixing assembly 20 and the control device 30 together define a system module 15 which is compact in its outer dimensions and can therefore be used in a highly flexible manner.

Figure 2:
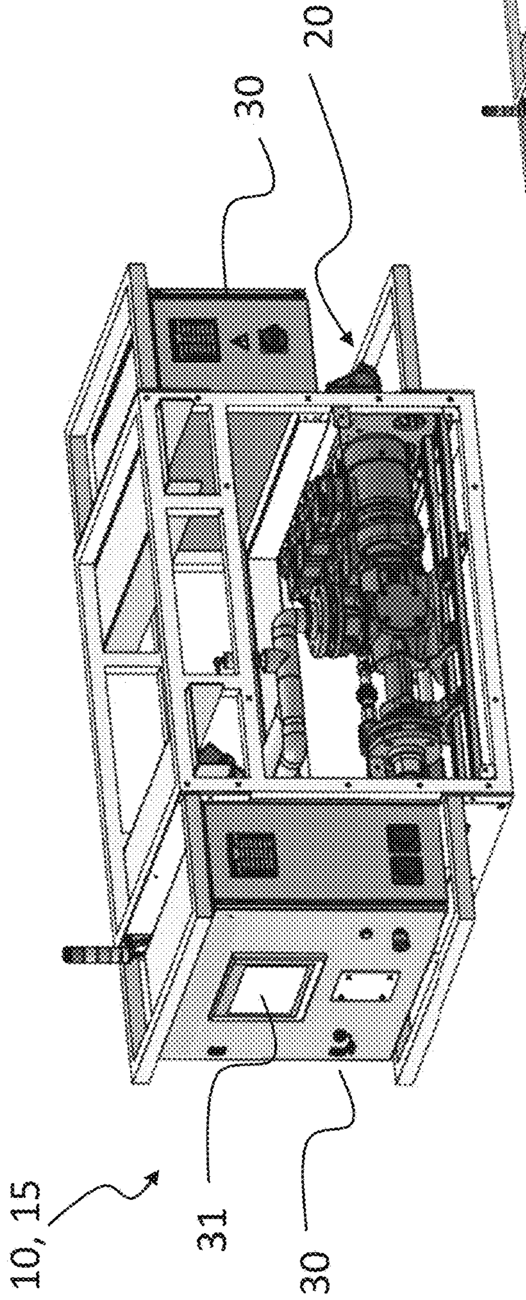
FIG. 2 is a perspective view of the mixing system provided according to the invention of FIG. 1, without a carriage.

FIG. 2 shows a perspective view of one exemplary embodiment of such a system module 15 which comprises a mixing assembly 20 and a control device 30.

Figure 3:
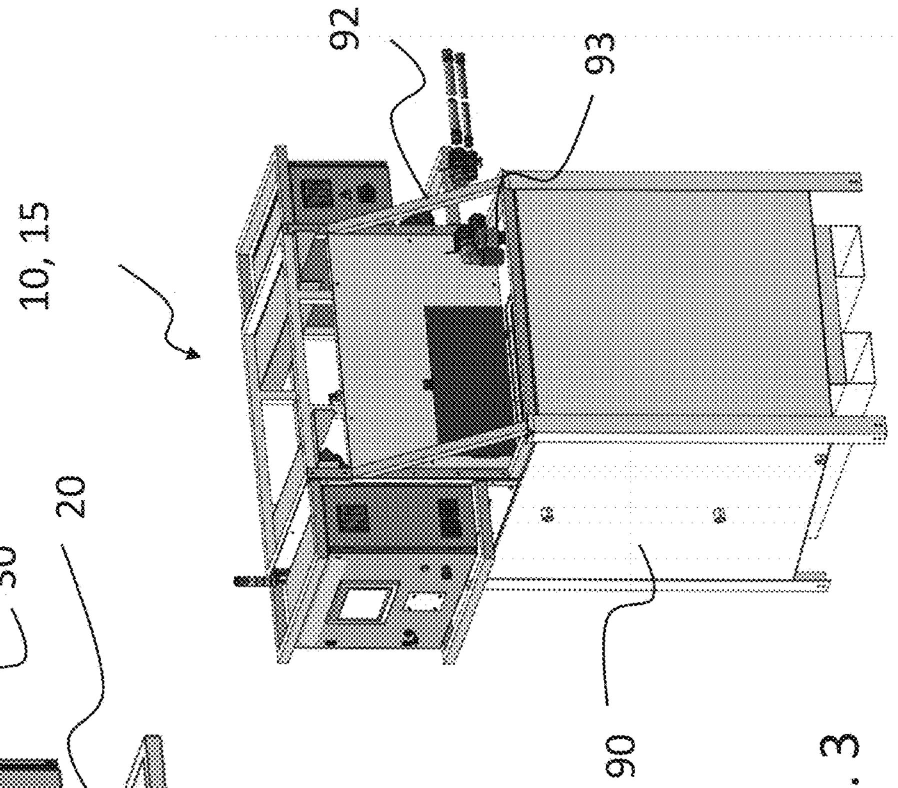
FIG. 3 is a perspective view of the mixing system provided according to the invention of FIG. 1, placed on a tank.

For example, this system module 15 can be placed particularly easily on a container 90, a target container, mixing container, preparation container or supply container, such as a tank, as shown in FIG. 3. The mixing system 10 can therefore be very easily moved along with a tank 90 when placed thereon, which provides a very high degree of flexibility.

Figure 4:
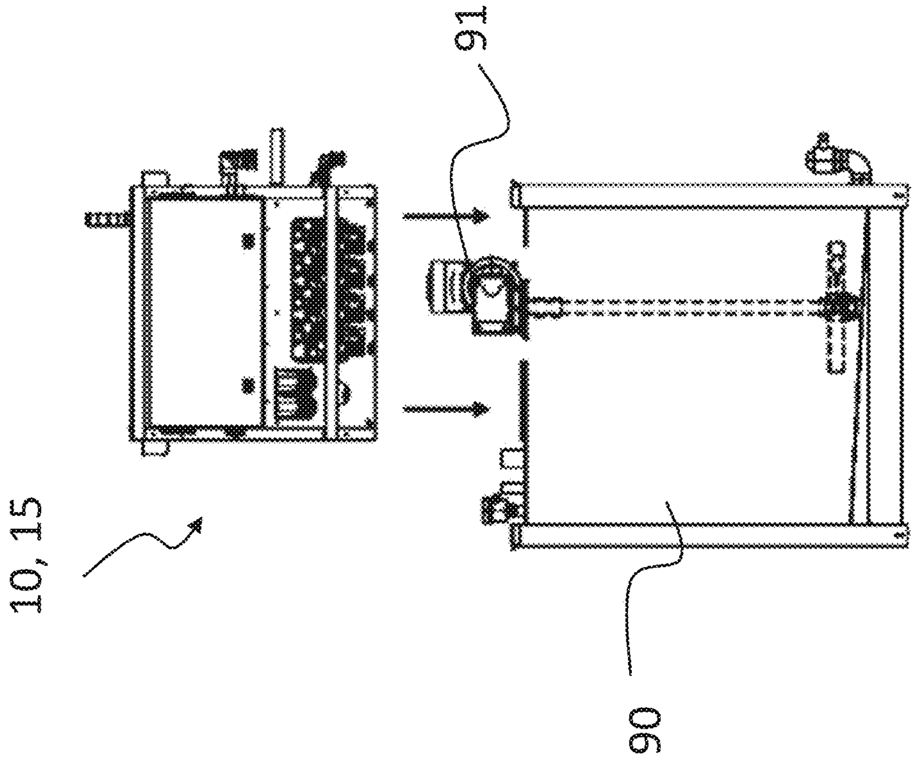
FIG. 4 shows a side elevational view of the mixing system provided according to the invention of FIG. 1 and of a tank.

FIG. 4 shows a side elevational view of the mixing system 10 provided according to the invention in the form of a system module 15, and of a tank 90, with the system module 15 not yet placed on top of the tank. In this example, the tank 90 is connected to a stirring device 91 which is placed on the tank. Favorably, the system module 15 is configured such that sufficient space remains for the stirring device 91 when the system module 15 is fitted on the tank 90.

Figure 5:
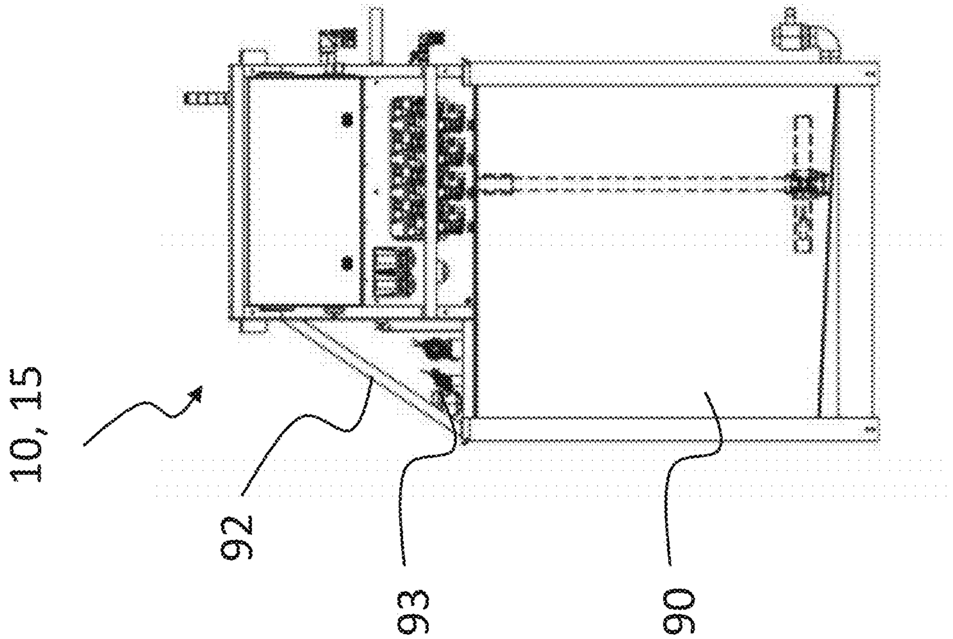
FIG. 5 shows a side elevational view of the configuration of FIG. 4, with the mixing system provided according to the invention placed on the tank.

FIG. 5 shows a side elevational view of the configuration of FIG. 4, with the mixing system 10 provided according to the invention placed on the tank 90. In the example of FIG. 5, the tube connection connecting the mixing system 10 to the tank 90 is not shown, in other words, the tank 90 is not yet connected to the mixing system 10.

As can be clearly seen in the embodiment shown in FIG. 5, the mixing system 10 is arranged directly above the container 90. For this purpose, the system module 15 is configured with and connected to a mounting or fitting 92 which is adapted to the specific features of the container 90. In the example, this fitting 92 is configured so as to comprise recesses for the stirring device 91 and ports 93 of the container 90, which are provided on the upper side. The fitting 92 can be made to precisely fit on the container to which the mixing system 10 is to be connected, so as to provide for a stable and reliable fit on the container 90. In the exemplary embodiment, the fitting 92 comprises a frame with a horizontal mounting plate for being connected to the tank, and a further mounting plate perpendicular thereto, which serves to establish a firm connection to the mixing system 10. In this way, a tight fit on the container 90 can be achieved, which can also withstand vibrations during operation. Moreover, auxiliary ways for a firm connection may be provided, such as screws, for connecting the mixing system 10, the fitting 92 and the container 90 to one another.

The mixing system 10 permits producing active agent compositions based on fluid according to predetermined rules and to provide them for further processing or manufacturing processes. For this purpose, the mixing assembly 20 comprises a conveyor 50 and a plurality of pipe assemblies 60, 70, 80 having different inlets for feeding fluid and/or liquid as well as outlets for dispensing active agent compositions.

Figure 6:
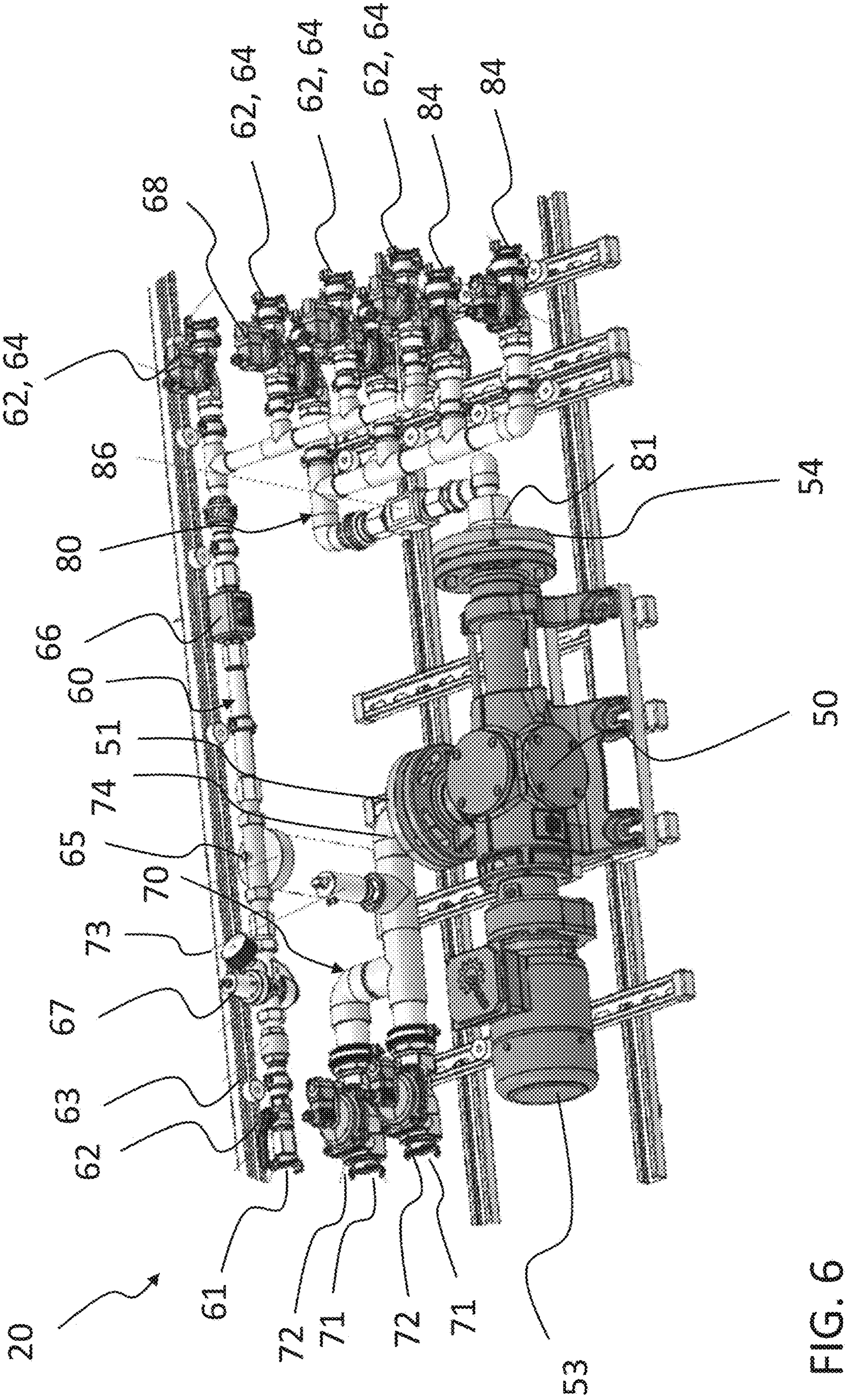
FIG. 6 is a perspective view of an exemplary embodiment of a mixing assembly according to the invention, comprising a conveyor and three pipe assemblies.

FIG. 6 shows, by way of an exemplary embodiment, a mixing assembly 20 provided according to the invention, comprising a conveyor 50 and three pipe assemblies 60, 70, 80. Conveyor 50 comprises a pump which is in the form of an eccentric screw pump in the exemplary embodiment, although other types of pumps can also be employed. In the exemplary embodiment, the conveyor 50 is driven by a driving device 53, in the example an electric motor.

Pipe assembly 60 has an inlet 61 for feeding liquid and a plurality of outlets 64 for dispensing liquid. Each of these outlets 64 can be connected to a container, in particular a preparation container, mixing container, or target container for holding active agent compositions. These containers 90 are not shown in the illustrated view. A total of four outlets 64 are provided in the exemplary embodiment, so that four containers 90 can be connected during operation.

Second pipe assembly 70 has two inlets 71 in the exemplary embodiment, each of which can be connected to a source, in the example a container that is holding a fluid, in particular a preparation container, mixing container, or supply container, and has at least one outlet 74 which is connected to the inlet 51 of the conveyor 50.

Finally, a third pipe assembly 80 is provided, which comprises one input 81 that is connected to the output 54 of the conveyor 50, and comprises a plurality of outlets 84, each of which can be connected to a destination, in the example a container, in particular a preparation container, mixing container, or target container for receiving active agent compositions. In the exemplary embodiment, a total of four outlets 84 are provided, so that four target containers can be connected to the conveyor 50 during operation. Pipe assemblies 60, 70, 80 comprise one or more pipes or pipe sections which connect the respective associated inlets to the outlets. In the exemplary embodiment, the pipe assemblies are made of circular pipes.

It will be appreciated that the illustrated embodiment with two inlets for fluid and with four outlets for the active agent compositions represents only one of many conceivable and possible arrangements. As a matter of course it is also possible to provide more than two inlets, for example three, four, five or more inlets for fluid, and two, three, four, five or more outlets for active agent compositions.

Inlets 61, 71 and outlets 64, 84 are equipped with couplings or connections known to those skilled in the art, in order to be able to establish a respective fluid-tight connection to a container 90 or a feed line.

For example, inlet 61 in the exemplary embodiment is equipped with a hose coupling for being connected to a water supply line, which water supply line is labeled "city water" (or tap water) in the figures. Inlets 71 and outlets 64 and 84 are also equipped with hose couplings in order to allow to establish a fluid-tight connection to the supply and target containers.

Pipe assemblies 70, 80 allow conveying fluid from connected supply containers to the target containers using the conveyor 50. For each target container to be connected, there is provided one output of the first pipe assembly 60, so that during operation, when the input 61 for feeding liquid is connected to a feed line for the respective liquid, for example to a water supply line, each target container can be supplied with liquid.

In the illustrated embodiment, ways for measuring and controlling the flow of material are arranged in the pipe sections of pipe assemblies 60, 70, 80. For example, pipe assembly 60 includes a stopcock 62, a non-return or check valve 63, a pressure reducing valve 67, a flow meter 66, and an electrically actuatable valve 65 which in one embodiment of the invention is installed such that it closes when the power supply is interrupted (valve version closed when de-energized). This significantly increases the operational safety of the system. Each of the outlets 64 is also equipped with an electrically actuatable valve 68, in the example also a solenoid valve. The check valve 63 can serve to avoid potential contamination of all kinds in the system. This includes, for example, unwanted or uncontrolled mixing, which might be caused by uncontrolled backflow in the feed lines or pipes, for example. Uncontrolled backflow may include excess material which already was applied but did not adhere to the substrate and therefore flowed back.

In the exemplary embodiment shown in FIG. 6, the stopcocks are in the form of electrically actuatable solenoid valves.

It has been found that instead of electrically actuatable solenoid valves, in particular electrically actuatable ball valves can be advantageous, since they also provide for simple controlling, but at the same time ensure greater reliability when opening and closing, especially in conjunction with the fluids that are employed. In order to increase system safety, it is beneficial to equip at least the water inlet with a valve with "closed when de-energized" functionality.

Therefore, an exemplary embodiment of the invention comprises stopcocks in the form of electric ball valves, with the exception of the stopcock for water inlet, and only the water inlet stopcock comprises an electrically actuatable solenoid valve which automatically closes in the event of power failure. In the exemplary embodiment of FIG. 6, ten electric ball valves and one electric solenoid valve can be installed for this purpose. The inlets 71 of pipe assembly 70 also include electrically actuatable valves 72, in the example solenoid valves, and a pressure reducing valve 77.

Pipe assembly 80 comprises a flow meter 86 and also electrically actuatable valves 88 at each outlet 84, in the example solenoid valves.

Instead of solenoid valves, electrically actuatable ball valves have also proven to be particularly suitable fittings for shutting off, since they can close firmly and reliably and are comparatively unproblematic with highly viscous or solid substances.

Electro-pneumatic valves can also be used. They have the advantage that they can close particularly quickly. However, a drawback is that they require a compressed air connection that has to be provided at the installation site.

Thus, in some embodiments, the mixing assembly 20 can be equipped with electrically actuatable ball valves.

In a further, likewise exemplary embodiment, the mixing assembly 20 is configured with an additional solenoid valve, at least at the inlet of the first pipe assembly 60. This additional solenoid valve is equipped with emergency stop functionality, so that the feed of liquid can be shut off when the power supply is interrupted. This prevents liquid from getting into the processes in an uncontrolled manner in the event of a power failure, thus representing a further safety feature of the mixing system 10.

According to yet another exemplary embodiment, it is contemplated for the mixing assembly 20, in particular the ball valves, to be equipped with position indicators for monitoring the position of the valves. On the one hand, this is a further safety feature, on the other hand, it permits to achieve a consistently high quality of the active agent compositions produced by the mixing system 10.

The mixing assembly 20 can be controlled using the control device 30, i.e. the flow through the individual pipe assemblies 60, 70, 80 can be controlled or closed-loop controlled according to predefined programs or operating modes.

For the sake of clarity, the wiring of the valves is not shown in the illustrations. Other configurations of the pipe assemblies 60, 70, 80 are conceivable and possible, with electrically actuatable valves being preferred since they can be controlled electrically and do not require a compressed air connection.

The illustrated mixing system 10 advantageously allows producing the same or different active agent compositions from one or two identical or different fluids and/or by adding liquids and to provide the so-produced active agent compositions in the target containers when the mixing system 10 is connected to the respective sources and destinations.

As shown in FIG. 3, the mixing system 10 can be placed directly on top of a container 90, in particular a tank. In this way, a tank fitting module can be provided, comprising the mixing system 10 and fitting 92.

As a matter of course, the mixing system 10 can also be adapted for being placed on top of other common packaging or bulk packaging means, optionally also on intermediate bulk containers, and the fitting 92 can be adapted accordingly. The mixing system can therefore also be combined with these common packaging means or intermediate bulk containers, for example with commercially available intermediate bulk containers that have a capacity of about 1,000 liters.

In the embodiment of the mixing system 10 as shown in FIG. 3, the mixing assembly 20, in particular the pipe arrangements 60, 70, 80, are located above the container 90 during operation. In addition to offering a particularly compact design, this top-mounted variant offers further advantages resulting from the predominantly vertical conveying with short horizontal conveying distances. This leads to significantly less adhesion or deposits in the pipe sections. As a result, cleaning costs are significantly reduced and the service life of the mixing system 10 is increased.

This embodiment moreover permits using high-viscosity fluids, i.e. fluids with a viscosity of, for example, 8000 mPa·s or more, as measured at a temperature of 20° C., so that concentrates in very high dosage can also be employed.

According to a further exemplary embodiment it is contemplated to place a further container 90, tank, or intermediate bulk container on top of the mixing system 10.

This arrangement of the mixing system 10 leads to a further positive effect, which can be seen in the fact that this arrangement allows for very short conveying distances for the fluid and/or the active agent compositions. In this way it is particularly easy to produce active agent compositions from highly viscous fluids.

The mixing system 10 provided according to the invention therefore allows minimizing the conveying distances which a feed material in the form of a fluid has to pass from the fluid inlet via the conveyor to the outlet into the target container. According to the invention, this conveying distance, which results from the addition of the lengths of the two pipe assemblies 70, 80, can be shortened to less than 6 m, optionally less than 4 m, and more optionally less than 3 m, or even 2 m. In the exemplary embodiment, a conveying distance of approximately 2 m is resulting. To this end, the system module 15 can have a length of less than 3 m, optionally approximately 2 m or less in some embodiments.

Hence, the mixing system 10 provided according to the invention is not only extremely compact, flexible, and mobile, but also makes it possible to use a particularly wide range of fluids, both low-viscosity and high-viscosity fluids, and to produce a wide variety of active agent compositions therefrom.

Other arrangements than the top mounted variant are of course also possible and conceivable, for example an arrangement of the containers laterally next to the mixing assembly 10, for example in order to arranged the control device centrally and to ensure an overall lower installation height of the mixing system.

Figure 9:
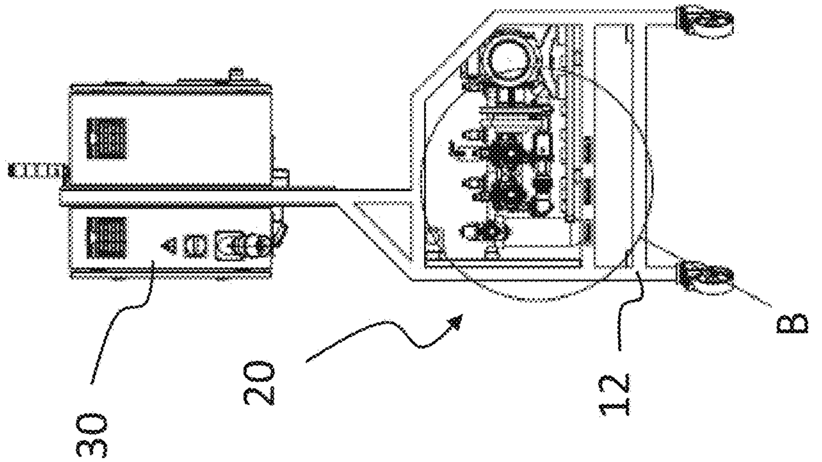
FIG. 9 is a further side elevational view of the exemplary embodiment of the mixing system provided according to the invention of FIG. 7, with a carriage.
Figure 8:
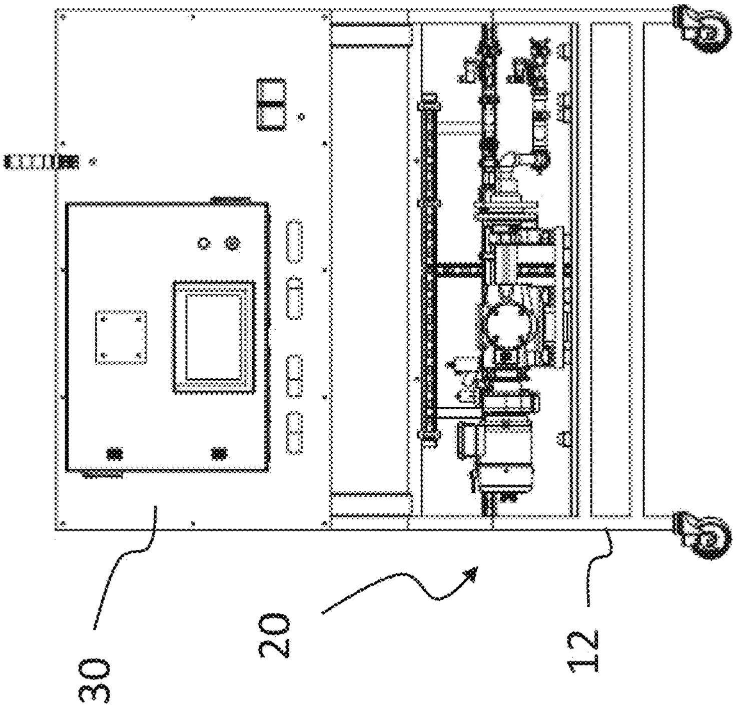
FIG. 8 is a front elevational view of the exemplary embodiment of the mixing system provided according to the invention of FIG. 7, with a carriage.
Figure 7:
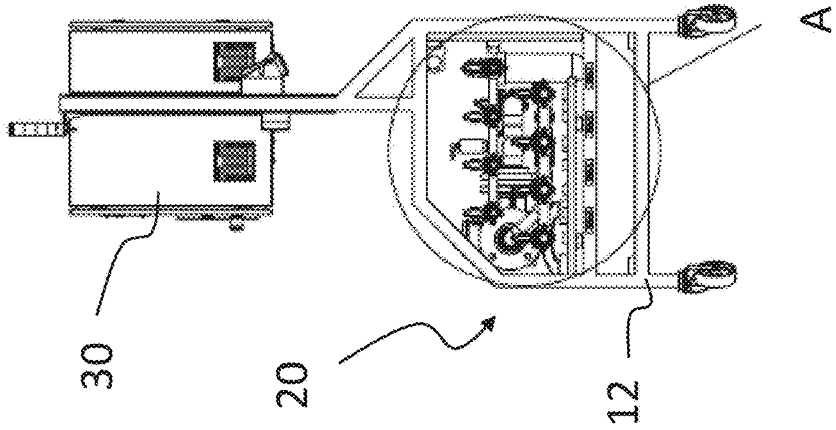
FIG. 7 shows a side elevational view of a further exemplary embodiment of a mixing system provided according to the invention, with a carriage.

FIGS. 7, 8 and 9 show such an arrangement of a mixing system 10, in which the mixing assembly 20 is placed in a carriage 12 and the control device 30 is arranged thereabove. This arrangement provides for a particularly stable and low design of the mixing system 10.

Figure 10:
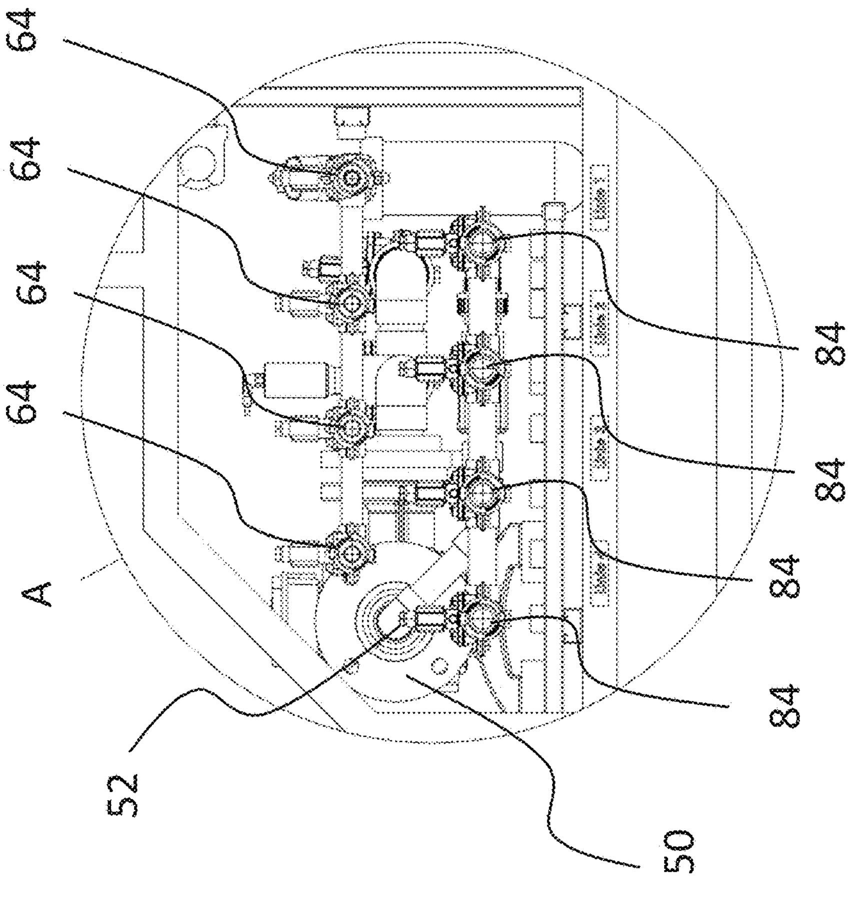
FIG. 10 is a sectional view of a detail of the mixing system according to section A of FIG. 7.

FIG. 10 shows a sectional view of a detail of the mixing system according to section A of FIG. 7.

Figure 11:
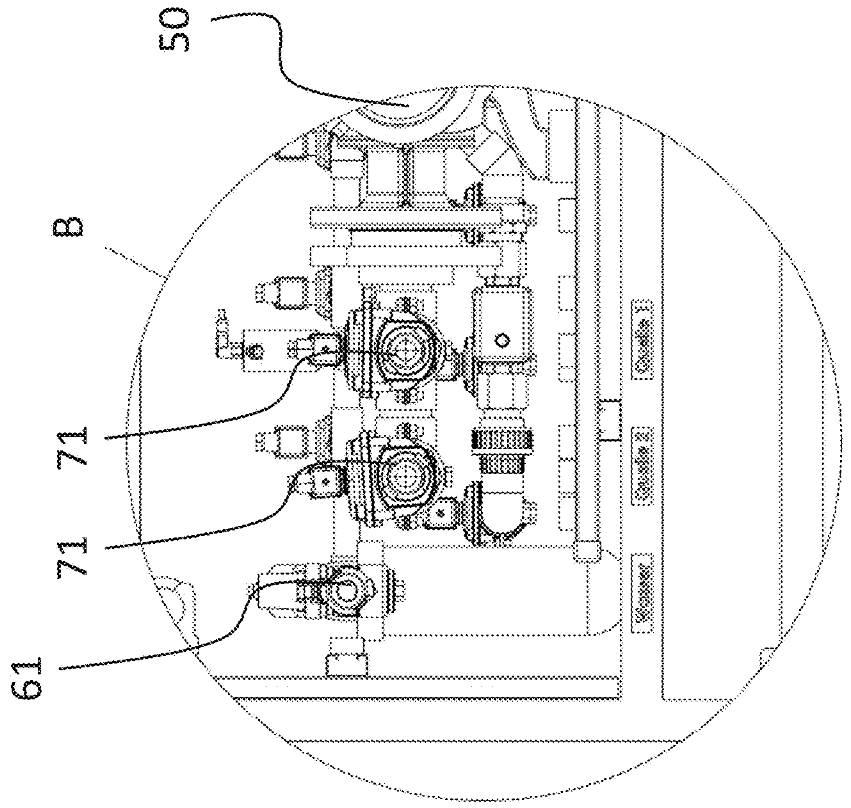
FIG. 11 is a sectional view of a detail of the mixing system according to section B of FIG. 9.

FIG. 11 shows a sectional view of a detail of the mixing system according to section B of FIG. 9.

Figure 12:
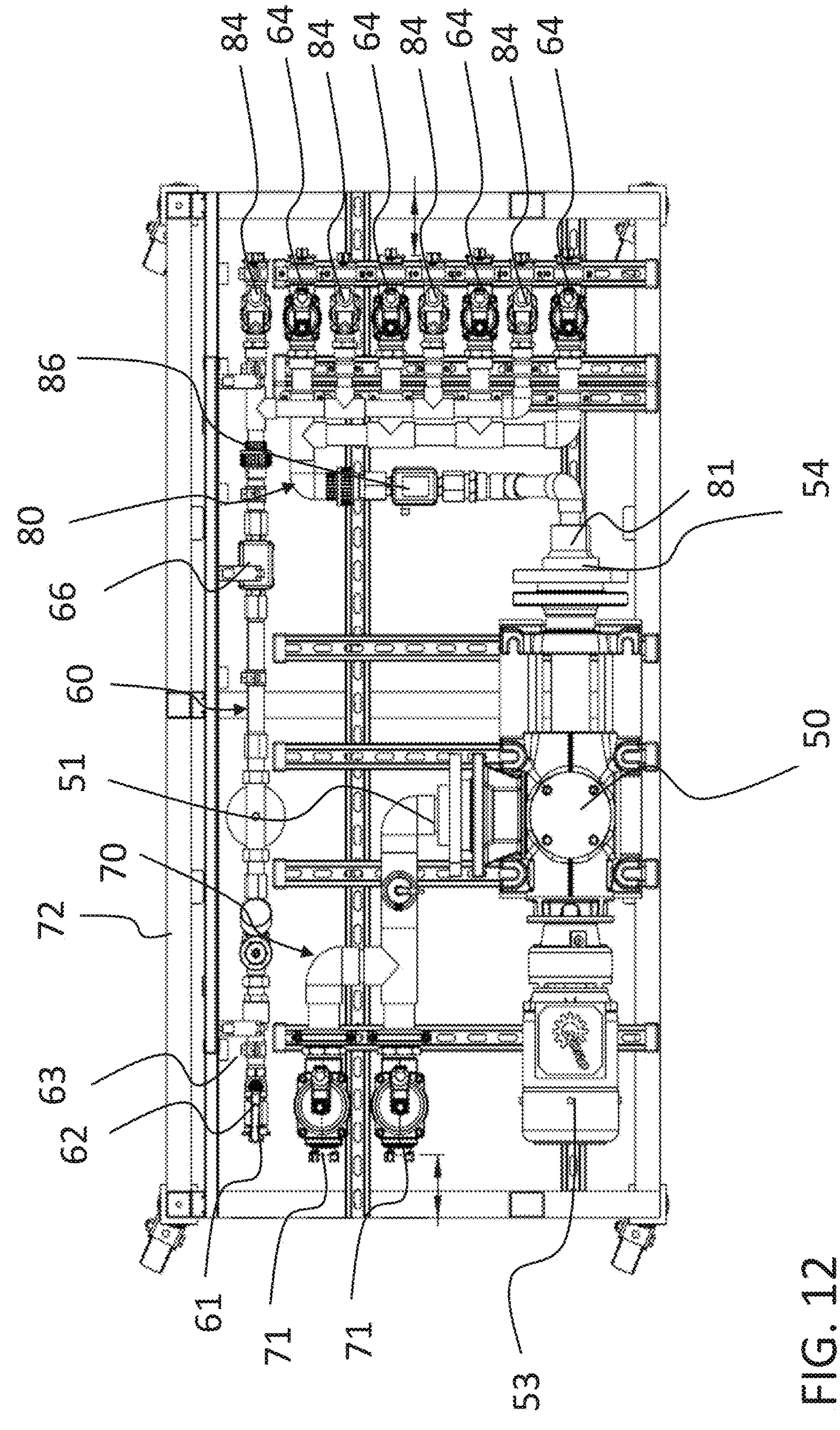
FIG. 12 shows a plan view of the mixing assembly shown in FIG. 6, comprising a conveyor and three pipe assemblies.

FIG. 12 shows a plan view of the mixing assembly of FIG. 6, comprising a conveyor and three pipe assemblies.

Control device 30 is configured to control the flow of material through the different pipe assemblies 60, 70, 80 and the conveyor 50 in order to produce the desired active agent compositions from the one or more fluids and/or with the addition of liquid according to specific rules.

The control device 30 is adapted for controlling the mixing system 10 using programs that define the mixing process and/or the operating mode. On the one hand, this permits to control the conveying or mixing process, and on the other hand it is possible to implement a specific operating mode for controlling the mixing assembly 20 in order to optimally adapt the mixing system 10 to the specific application conditions.

Thus, highly advantageously, the mixing assembly 20 provided according to the invention in combination with the control device 30 allows operating the mixing system 10 provided according to different operating modes during operation.

Therefore, advantageously, the mixing system 10, in particular in the form of system module 15, can be built cost-efficiently with the same design for different applications, and can then be configured accordingly on site or during commissioning in order to implement the desired operating modes. For this purpose, the control device 30 is equipped with a user interface 31.

In some embodiments, control device 30 is configured for allowing the mixing assembly 20 to be controlled in more than one operating mode, optionally in two and more optionally in three or even four different operating modes.

For example, it is possible for the mixing system 10 to be configured upon commissioning such that an operating mode appropriate for the intended application is selected and the control device 30 is set or programmed accordingly for this purpose. This procedure is particularly reliable, since no manipulations or modifications to the mixing system must be or can be carried out by an operator.

In some embodiments, it is also possible to provide a plurality of operating modes which can then be selected on site, by an operator.

FIGS. 13, 14, 15, and 16 show schematic flow diagrams associated with the operating modes "mixing mode", "dilution mode", "powder preparation mode", and with the "powder preparation with pre-dilution" operating mode.

Figure 13:
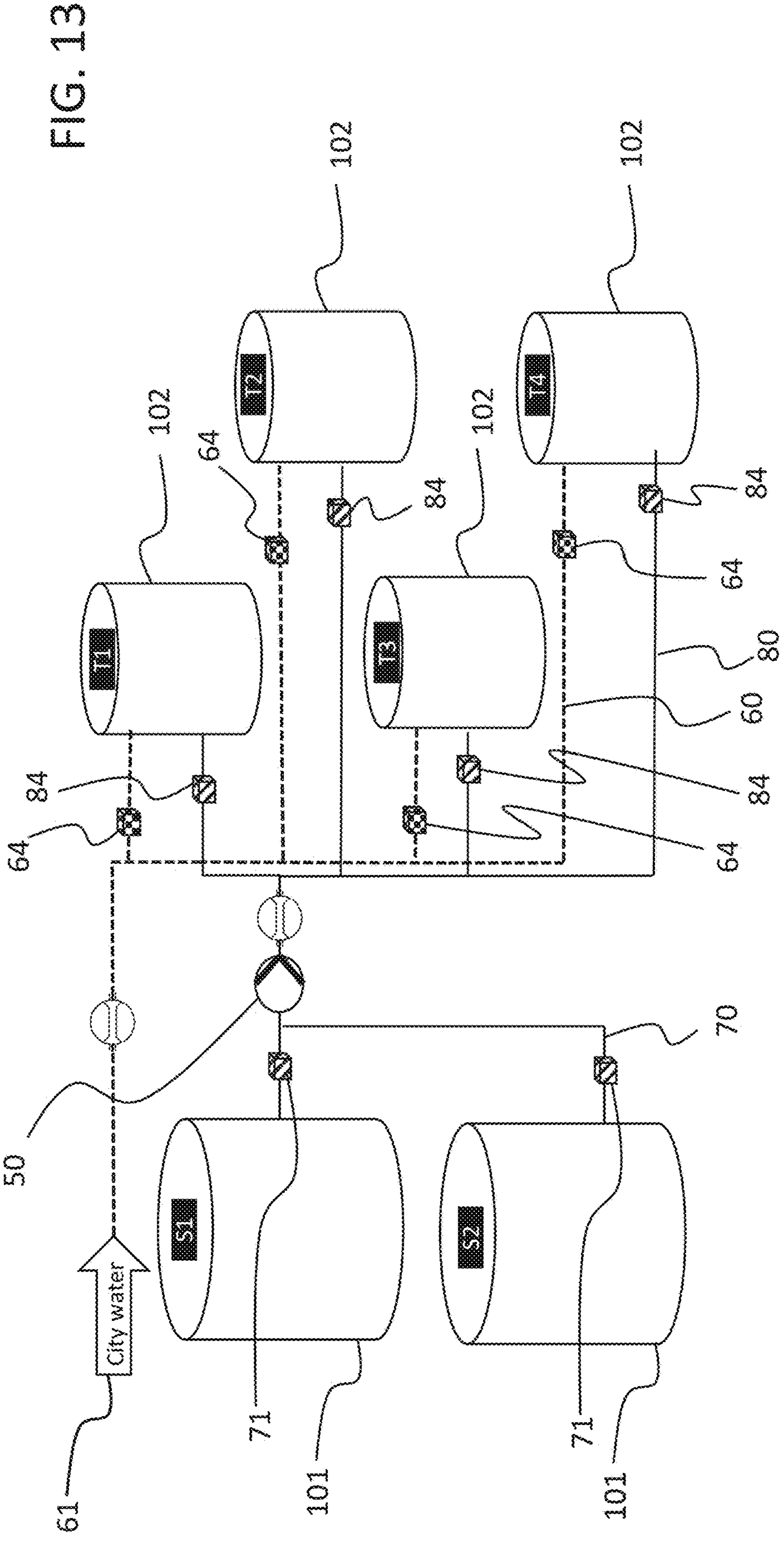
FIG. 13 is a schematic flow diagram illustrating the "mixing mode" operating mode.

In the "mixing mode" according to FIG. 13, the mixing system is configured for producing up to four different mixtures as active agent compositions and for dispensing the produced active agent compositions to the associated four target containers using at least up to two fluids, while the first pipe assembly allows to add liquid to the target containers, for example water.

In this operating mode, the first supply container 101 can contain a first fluid, for example a fertilizer, and the second supply container 101 can contain a second fluid, for example a crop protection agent. These fluids can be conveyed through the second pipe assembly 70 to the conveyor 50 and from there can be further conveyed to one of the associated target containers 102. In some embodiments, the number of target containers 102 is determined according to the number of active agent compositions to be mixed.

In this way it is possible to produce active agent compositions on the basis of the two fluids in different mixing ratios or concentrations, for example with a ratio of fertilizer to crop protection agent of 90:10 in a first target container 102, 80:20 in a second target container 102, 50:50 in a third target container 102, or 10:90 in a fourth target container 102. It goes without saying that these details are purely exemplary and that any possible concentration is of course possible and conceivable.

Furthermore, liquid can be fed into the target containers 102 as required, via the outlets 64 of the first pipe assembly 60.

Figure 14:
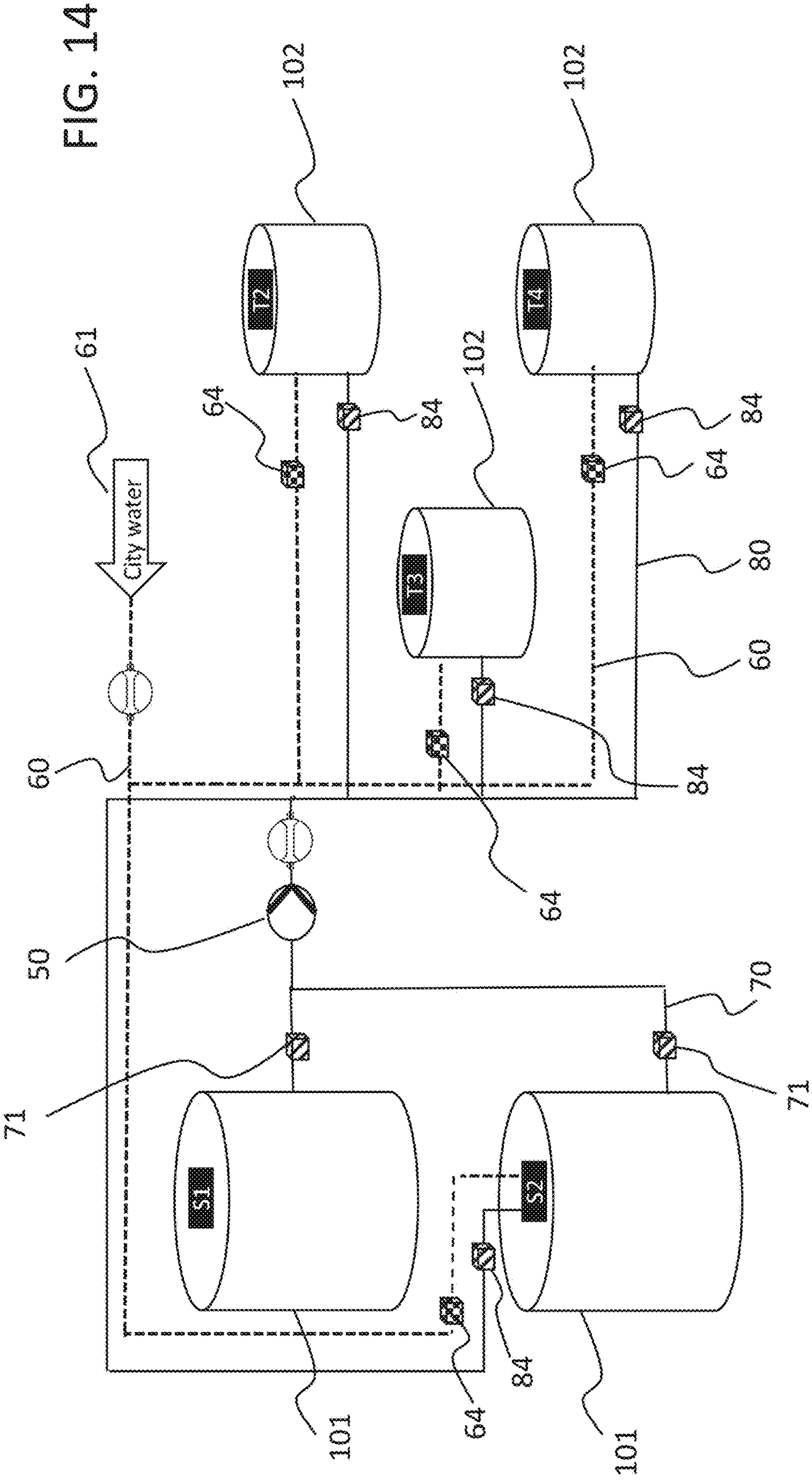
FIG. 14 is a schematic flow diagram illustrating the "dilution mode" operating mode.

According to a "dilution mode" as shown in FIG. 14, the mixing system 10 is configured for pre-dilution, in which case a high dosage fluid can be provided in a lower dosage.

In this case, fluid from a supply container 101 is provided in diluted form in a target container 102, i.e. the target container 102 virtually provides a supply container 101 with fluid in a lower dosage. For this purpose, at least one outlet of the first pipe assembly 60 is used to supply liquid, and fluid from the supply container 101 with high dosage is used to produce a dilution of the material, and the diluted material is provided in the target container as a second supply container 101. This dilution mode is particularly suitable when fluid is to be supplied in a highly viscous form.

For this purpose, the second supply container 101 may have a trigger which is able to send a signal to the control device 30 in order to prepare a further dilution and to refill the second supply container 101 with diluted fluid for further supply.

The mixing system 10 provided according to the invention can advantageously be used in the "dilution mode" to supply up to three target containers 102 with diluted material.

Figure 15:
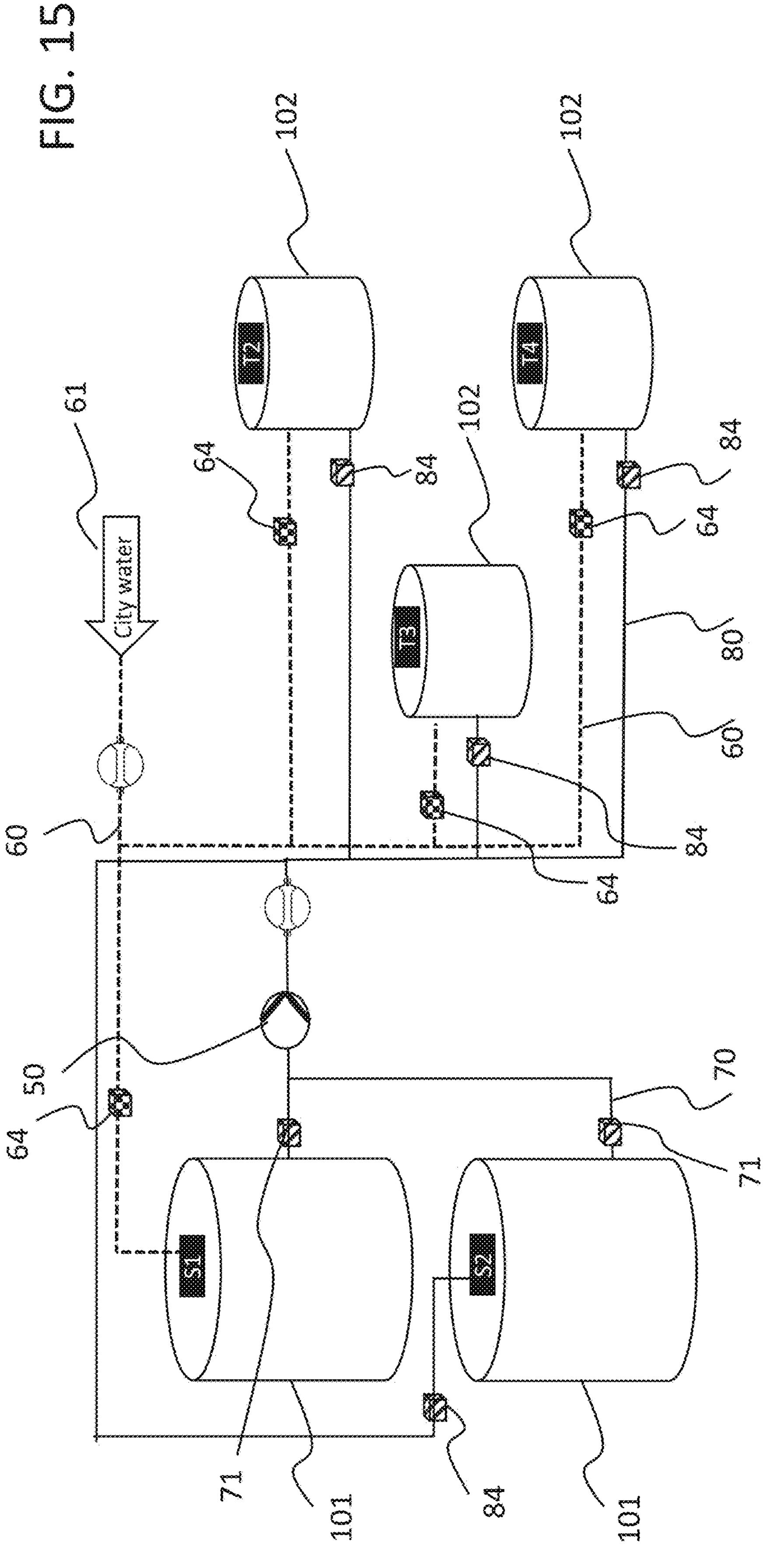
FIG. 15 is a schematic flow diagram illustrating the "powder preparation mode" operating mode.

According to a third "powder preparation mode" as shown in FIG. 15, the mixing system 10 is configured for producing a powder preparation. In this mode of operation, an active agent can be filled into a target container in solid form, for example in powder form, in the form of granules or pellets; the process is similar to the dilution mode described above.

In this case, active agent in solid form can be dispersed in the first supply container 101 by adding water and can be pumped into the second supply container 101. In the "powder preparation mode", the mixing system 10 of the invention can also be used to supply up to three target containers 102 with diluted material on the basis of the active agent fed in solid form.

Figure 16:
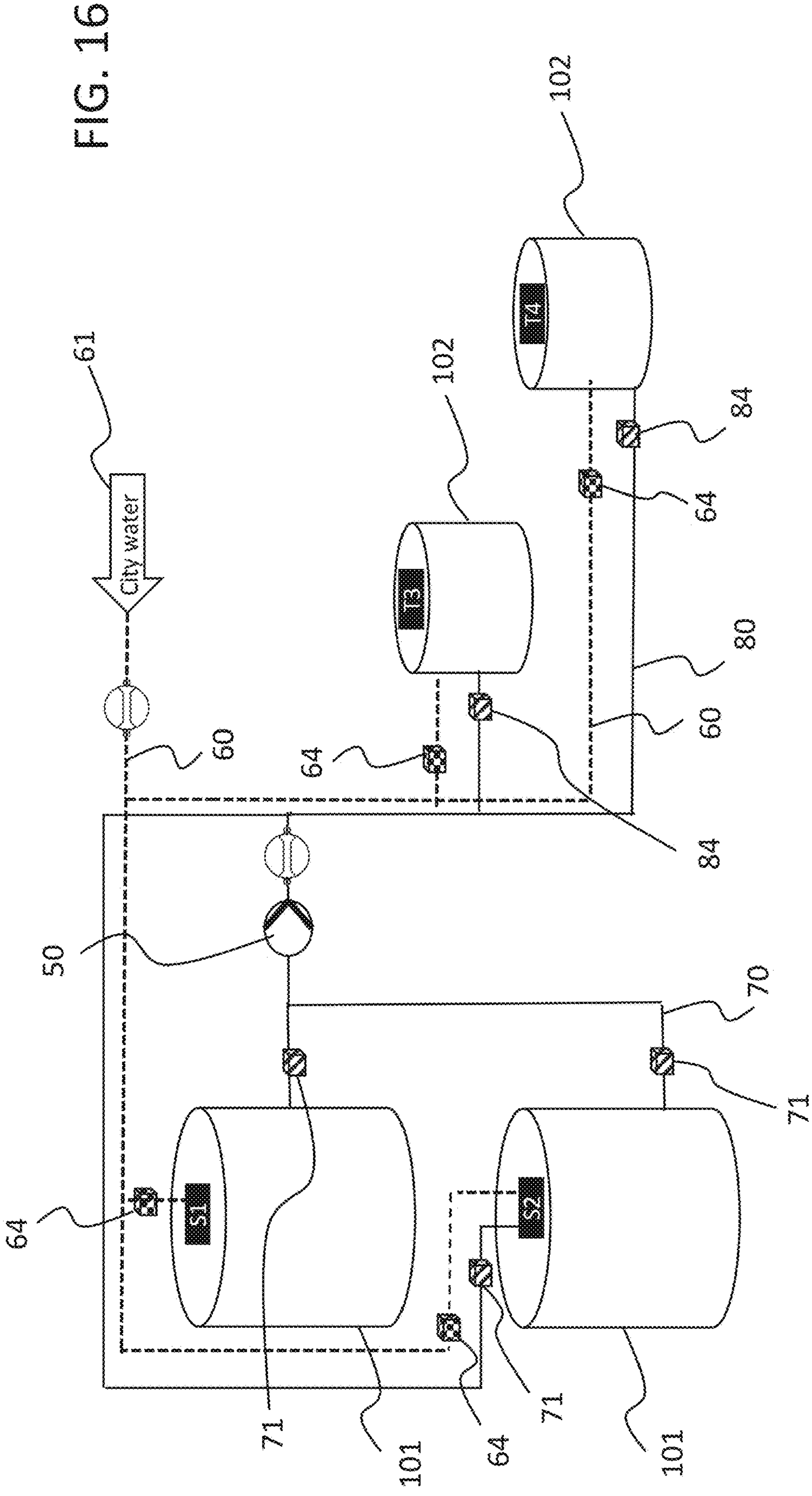
FIG. 16 is a schematic flow diagram illustrating the "powder preparation with pre-dilution" operating mode.

A fourth, likewise exemplary operating mode is shown in FIG. 16 and represents a combination of the dilution mode and the powder preparation mode. This mode can therefore also be referred to as a "powder preparation with pre-dilution" operating mode.

For this purpose, a water supply can be prepared in the first supply container 101. By supplying liquid and fluid from the first supply container 101, a diluted fluid can be provided in the second supply container 101.

Again, up to three target containers 102 can be fed with (diluted) material from the two supply containers 101 in this operating mode.

Figure 17:
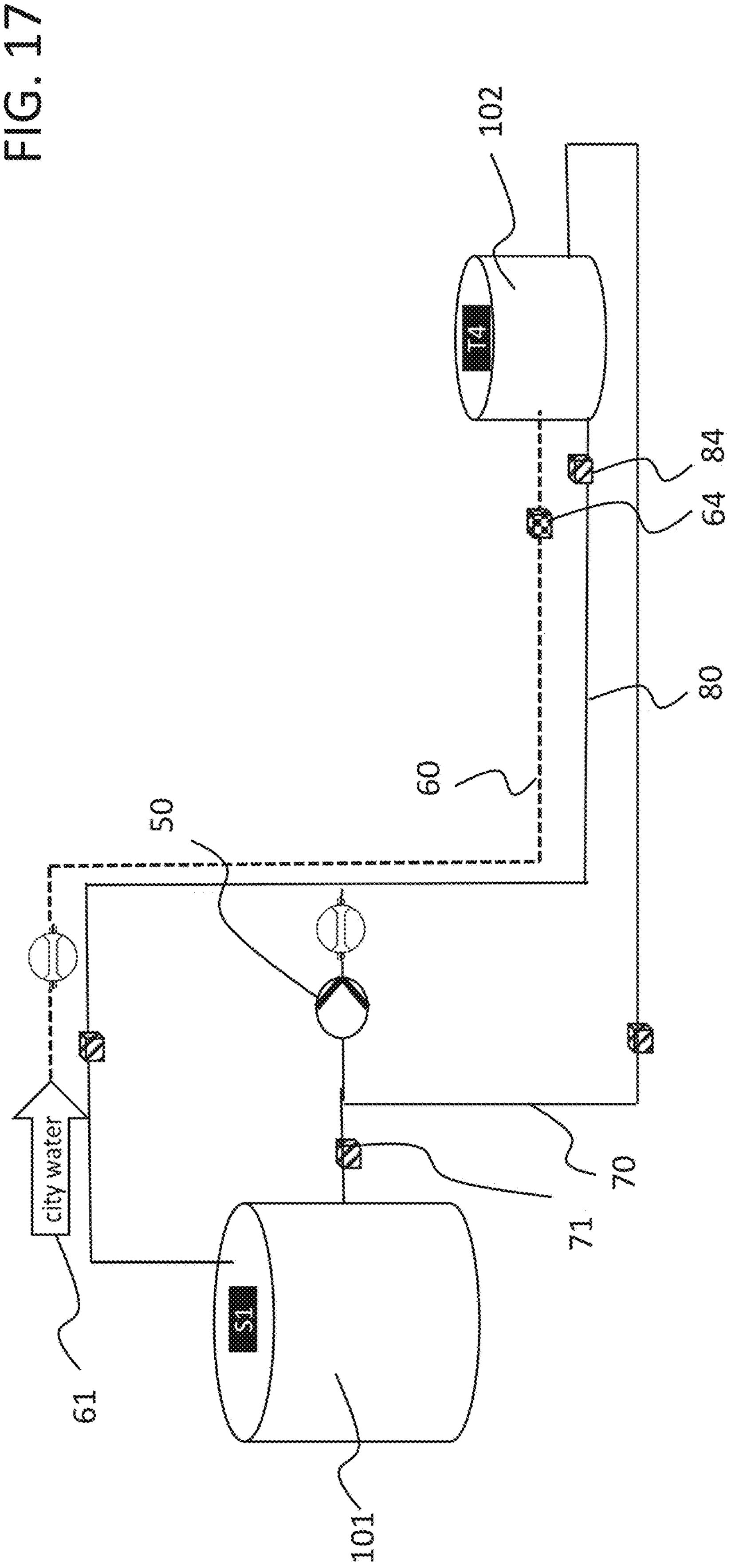
FIG. 17 is a schematic flow diagram illustrating a further operating mode for adjusting an existing dispersion.

FIG. 17 is a schematic flow diagram showing a further operating mode for adjusting an existing dispersion.

Figure 18:
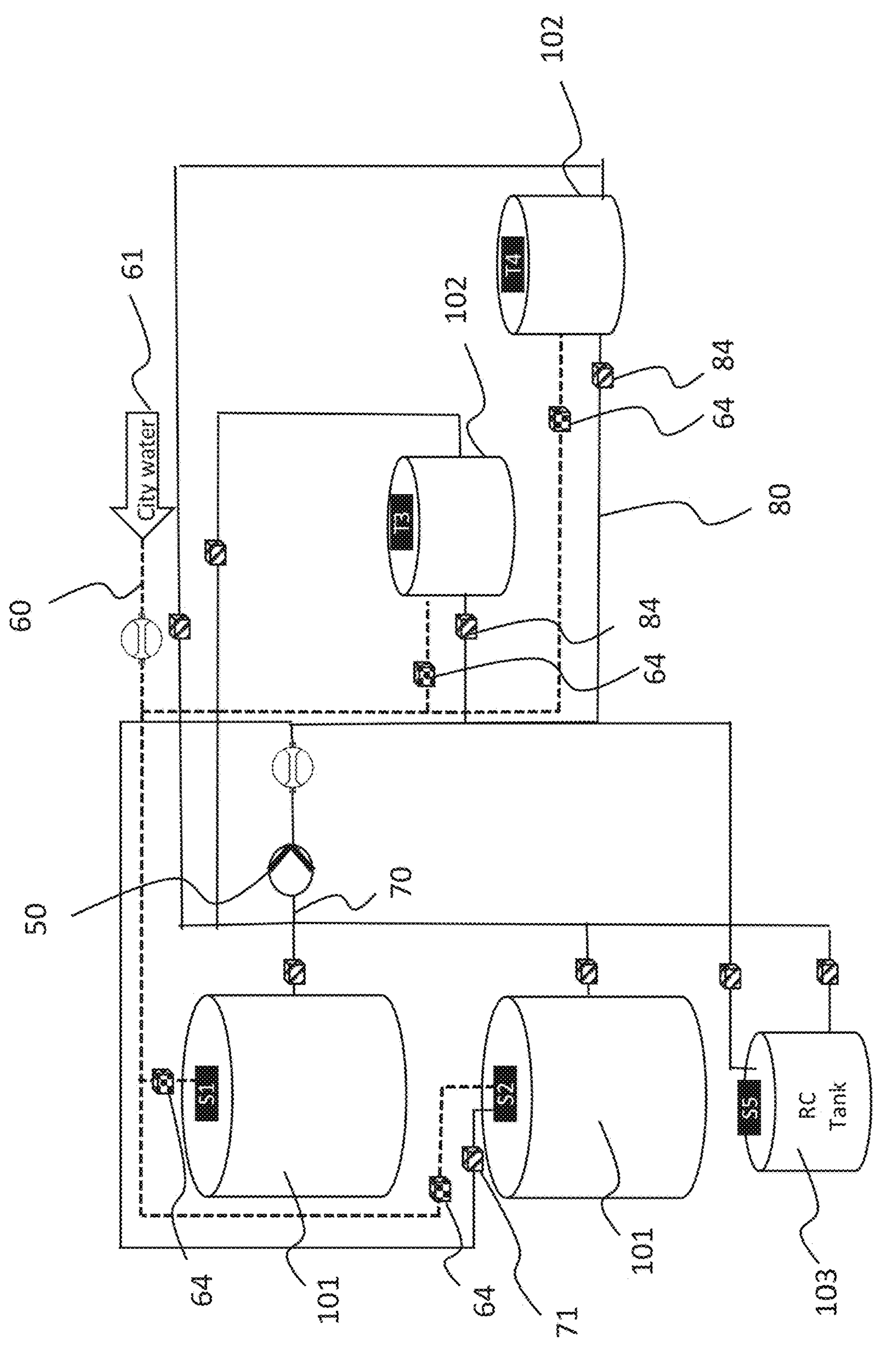
FIG. 18 is a schematic flow diagram illustrating the operating mode according to FIG. 17 with an additional tank.

FIG. 18 is a schematic flow diagram showing the operating mode according to FIG. 17 with an additional rapid change (RC) tank 103. The mixing system 10 is configured with a further, third inlet in this case, to which the RC tank is connected.

According to a further embodiment of the invention it is also possible to fill a supply container of the mixing system 10 only with liquid, for example with distilled water, without an active agent. This can be helpful in certain cases, for example if the available tap water is not suitable for preparing the active agent composition. To this end, it can be helpful to equip the second pipe assembly with three inlets, so that still two fluids can be fed to the mixing system 10.

It will be apparent to a person skilled in the art that this variety of functionalities and operating modes of the mixing system 10 only represents a selection and that further functionalities and operating modes are conceivable and possible.

For example, a mixing system 10 in which the second pipe assembly 70 has more than two inlets 71, in particular three or four inlets 71, is also considered. This makes it possible to provide ready-to-dose active agent compositions from more than two sources, such as three or four sources.

Figure 20B:
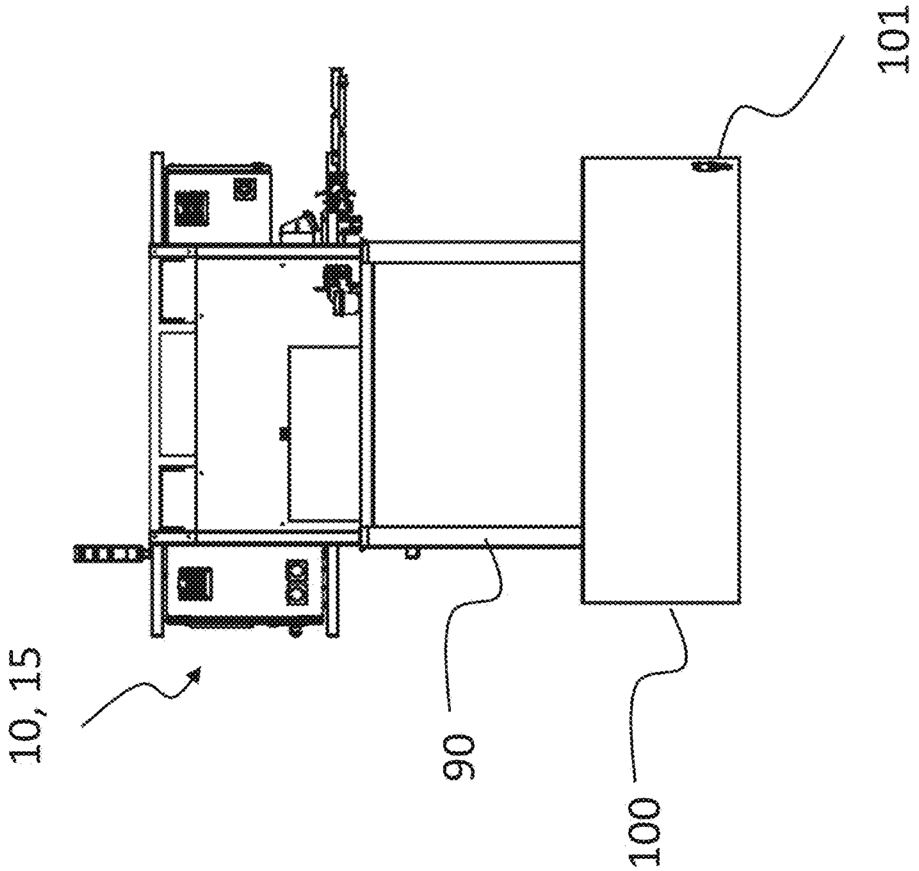
FIGS. 20A and 20B show a side elevational view and a front elevational view of the mixing system provided according to the invention of FIG. 1 placed on a tank, with a collector.
Figure 20A:
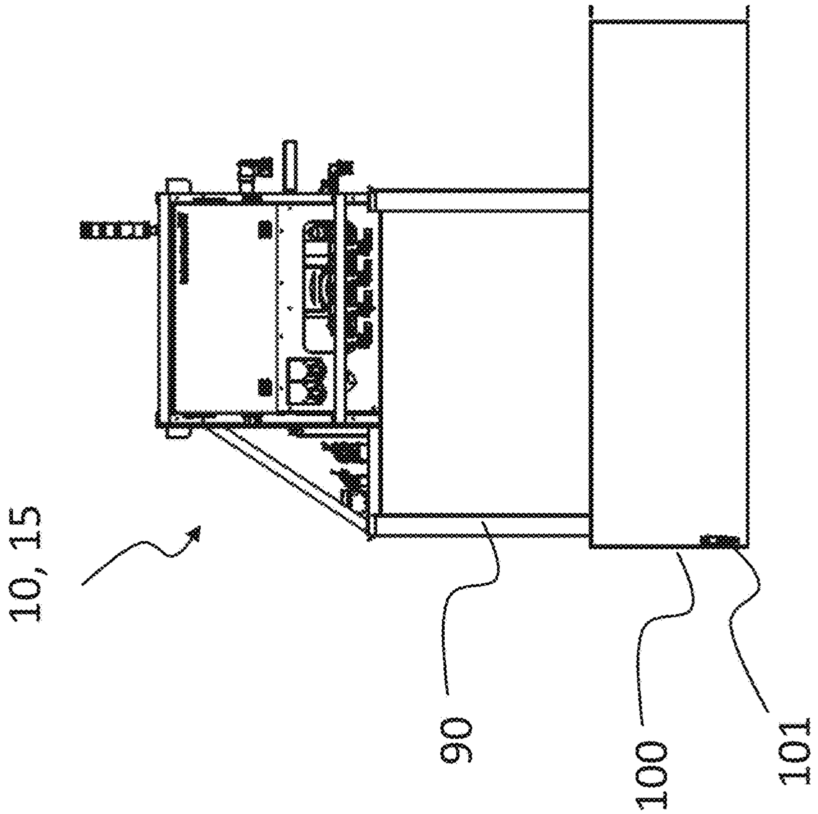

In FIGS. 20A and 20B, the mixing system 10 provided according to the invention from FIG. 1 is placed on a tank 90, and the mixing system 10 is additionally provided with a collector 100. In this exemplary embodiment, a collecting trough is provided as the collector 100, which is arranged below the tank 90. Accordingly, the tanks 90 and the mixing system 10 are placed in the collector 100, so that fluid leaking from the tanks 90 or from the mixing system 10 will be accommodated in the collector 100 and cannot get on the floor. For this purpose, the collector is dimensioned accordingly, for example so as to be able to optionally completely hold the volume of a tank 90.

In some embodiments, the collector 100 can be coupled to the carriage 12 and can be moved together with it, which further enhances the mobility of the system. For this purpose, the carriage 12 can comprise the collector, in which case the wheels can be arranged below the collecting trough.

Furthermore, leakage sensors 101 are provided, which are attached in the collector 100 in the example, and which are able to detect the presence of a fluid or a liquid in the collector 100.

For this purpose, the control device 30 is configured with corresponding signal inputs which are coupled to the leakage sensors 101. In this way, the control device 30 can stop and interrupt all conveying processes of the mixing system 10 in the event of a leakage message, i.e. if fluid or liquid appears in the collector 100, for which purpose the conveyor 50 or a pump can be switched off. Also, valves and/or stopcocks can be closed. In this way, an overflow of the collector 100 can be counteracted, and the operational safety of the system can be significantly increased.

In this way, the mixing system 10 can be provided with comprehensive leakage protection.

Figure 19:
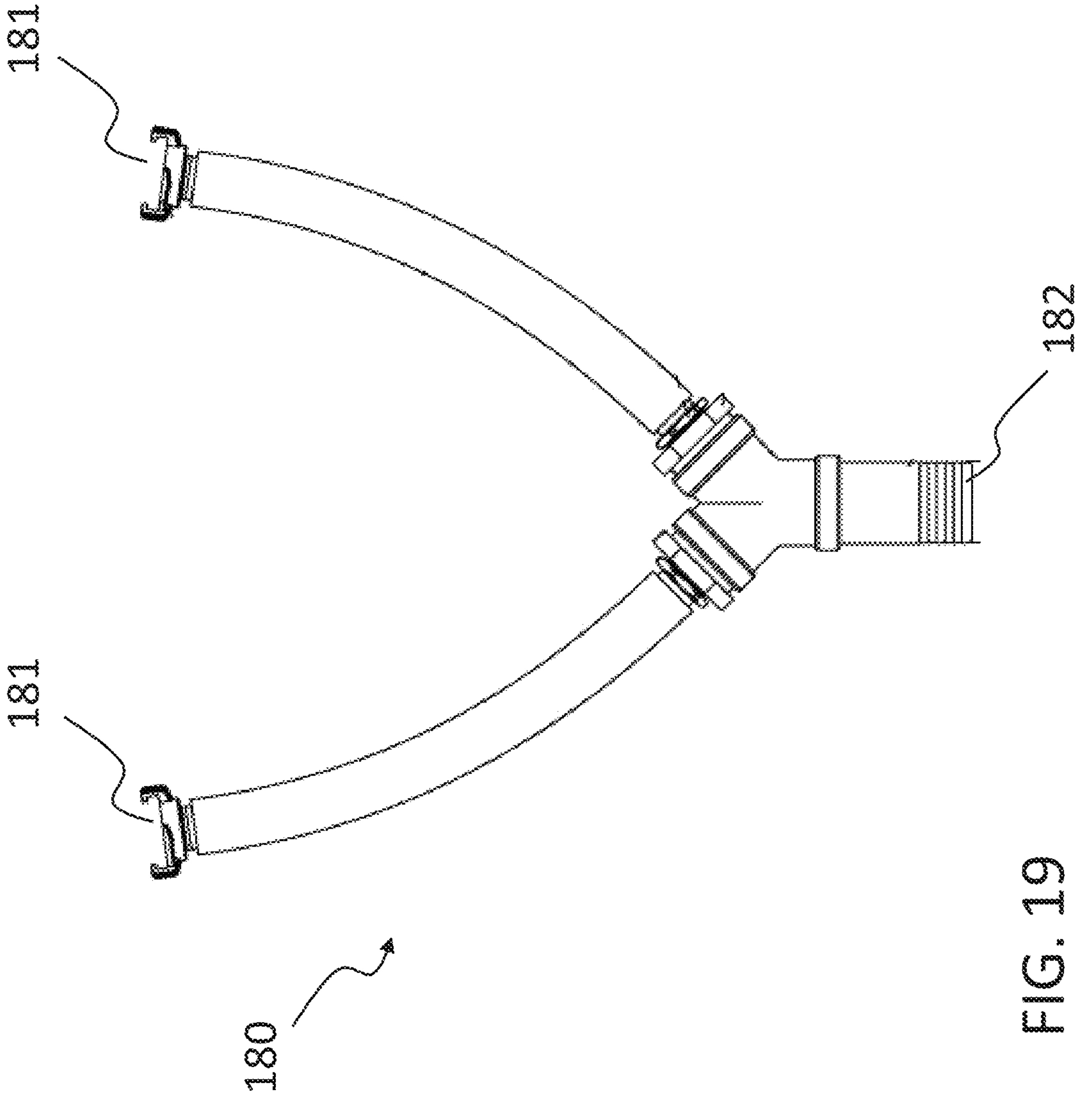
FIG. 19 shows a Y-adapter.

Finally, FIG. 19 shows a Y-adapter 180 which has two inlets 181 and one outlet 182 in the example. The advantage, for example when supplying to a target container, is that in the case of two different fluids, for example, these two fluids will already be mixed when being introduced into the target container.

The invention thus provides an easy-to-manufacture modular mixing system 10 which can be used on site in a highly flexible manner and can be set or programmed according to the intended application. The mixing system 10 can be adapted to existing tank or container systems or simply fitted on top thereof.

This provides a wide range of possible applications, starting with dispersing to obtain useful solid-liquid mixtures from one or two fluids in different concentrations and mixing ratios, with or without adding liquid for dilution.

The subject-matter of the invention therefore also provides a method for providing active agent compositions from fluid, optionally by using a mixing system 10 as described above.

The method makes it possible to provide different active agent compositions from different fluids and/or with the addition of liquid.

The mixing system 10 and the method for providing active agent compositions from fluid therefore allow easily and flexibly producing active agent compositions, for example mixtures such as fertilizer or plant protection mixtures for agriculture, or other mixtures, release agents, mold release agents, or lubricants, for example anti-tack agents for compounds for the rubber processing industry.

However, the mixing system provided according to the invention and the method provided according to the invention may also be used in polymer processing, for example.

More generally, the mixing system 10 can be used wherever fluids have to be converted into ready-to-use fluids or active agent compositions by dilution, for example in water treatment sectors, in hygiene, for example for diluting cleaning agents, in cosmetics or pharmaceutical sectors.

Release agents, lubricants, and mold release agents are essential process aids for the polymer manufacturing and processing industries—for mixing, curing, and other process steps.

The use of anti-tack agents for compounds permits to prevent surfaces of uncured rubber compounds from undesirably sticking together. The use of mold release agents allows to prevent the molded part from adhering to the mold during the curing process. The use of lubricants permits to prevent uncured and cured products from adhering to surfaces, e.g. to system parts.

Anti-tack agents for compounds may, for example, be supplied in liquid form in packaging means, optionally in intermediate bulk containers (IBCs), or in solid form, for example in powder form, as granules or in the form of pellets, in paper bags, in flexible intermediate bulk container (FIBCs), or in bulk boxes also known as octabins, and can be fed into the mixing system 10. By diluting with water, the mixing system 10 provided according to the invention permits producing a dispersion as an active agent composition, which can be used to treat rubber compounds in the form of skins, strips, or blanks, for example by dip- or spray-coating. The film that will have formed on the surface of the rubber compound after drying ensures a high release effect and sliding properties optimized for extruder feed.

The excellent wetting behavior leads to very even film formation, which means that low consumption rates can be achieved. As a result, only small amounts of release agents, which usually do not form part of the actual compound formulation, will be introduced into the rubber compounds during further processing.

Such anti-tack agents for compounds, as available under the trade name PROMOL® SL from Barbe, Wiesbaden, for example, can also make a contribution to the cleanliness of production lines and their immediate surroundings. For example, when used in a batch-off system, the metal bars in a cooling tunnel of the production line will largely remain free of soapy residues.

Furthermore, hardly any foam will build up, in particular when provided directly at the supply point, since air entry can be minimized.

Moreover, the active agents can be provided without fillers, which could interfere during subsequent processing into technical rubber articles. This means that all constituents of the release agent are completely meltable at comparatively low temperatures.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A mixing system configured to provide an active agent composition to one or more target containers, the mixing system comprising:

a pump having an inlet and an outlet;

a first pipe assembly having at least one inlet and a plurality of outlets, said at least one inlet configured to connect in a fluid-tight manner to a supply of a liquid and each of said outlets configured to connect in a fluid-tight manner directly to one or more of said target containers by passing said pump;

a second pipe assembly having at least one inlet and at least one outlet, said at least one inlet configured to connect in a fluid tight manner to one or more supply containers, said at least one outlet having a fluid-tight connection to said inlet of said pump;

a third pipe assembly having an inlet and a plurality of outlets, said inlet having a fluid-tight connection to said outlet of said pump, and one or more of said outlets configured to connect in a fluid-tight manner to one or more of said target containers; and a control device configured to control flow of materials through said mixing system.

2. The mixing system of claim 1, wherein at least one of the following is satisfied:

the mixing system is or can be placed on top of a container, a supply container, a target container, a tank, a packaging, a bulk packaging, and/or an intermediate bulk container (IBC); or a container, a supply container, a target container, a tank, a packaging, a bulk packaging, and/or an IBC can be placed on top of the mixing system.

3. The mixing system of claim 1, wherein a conveying distance for material that is fed in the form of a fluid is less than 6 m from said at least one inlet in said second pipe assembly via the pump to said one or more outlets in said third pipe assembly into the target container.

4. The mixing system of claim 1, wherein the control device is configured for controlling the mixing system on the basis of programs which define a mixing process and/or an operating mode.

5. The mixing system of claim 4, wherein the control device is configured to control a flow of material through the mixing system on the basis of programs which define the mixing process and/or an operating mode.

6. The mixing system of claim 1, further comprising leakage protection comprising at least one collector and/or at least one leakage sensor.

7. The mixing system of claim 1, wherein the mixing system is configured for a plurality of operating modes.

8. The mixing system of claim 1, wherein according to a first operating mode the mixing system is adapted for producing active agent compositions according to a predetermined number of programs and for dispensing the produced active agent compositions into associated target containers.

9. The mixing system of claim 1, wherein according to a second operating mode the mixing system is adapted for producing pre-diluted material, thereby providing a fluid with a lower dosage or as a diluted material on the basis of a fluid with a high dosage.

10. The mixing system of claim 1, wherein according to a third operating mode the mixing system is adapted for producing an active agent composition from an active agent in a solid form.

11. The mixing system of claim 1, wherein the mixing system is configured according to a fourth operating mode in which a second operating mode and a third operating mode are combined, wherein according to the second operating mode the mixing system is adapted for producing pre-diluted material, thereby providing a fluid with a lower dosage or as a diluted material on the basis of a fluid with a high dosage, and wherein according to the third operating mode the mixing system is adapted for producing an active agent composition from an active agent in a solid form.

12. The mixing system of claim 1, further comprising:

a plug-on or fitting for placing the mixing system on top of a container, a tank, or an intermediate bulk container; and/or a support for holding a further container, tank, or intermediate bulk container.

* * * * *